(12) United States Patent
Palumbo

(10) Patent No.: US 11,174,050 B2
(45) Date of Patent: Nov. 16, 2021

(54) APPARATUS AND METHOD OF PACKAGING A PRODUCT

(71) Applicant: Cryovac, LLC, Charlotte, NC (US)

(72) Inventor: Riccardo Palumbo, Arona (IT)

(73) Assignee: Cryovac, LLC, Charlotte, NC (US)

( * ) Notice: Subject to any disclaimer, the term of this patent is extended or adjusted under 35 U.S.C. 154(b) by 210 days.

(21) Appl. No.: 16/470,724

(22) PCT Filed: Dec. 28, 2017

(86) PCT No.: PCT/IB2017/058463
§ 371 (c)(1),
(2) Date: Jun. 18, 2019

(87) PCT Pub. No.: WO2018/122765
PCT Pub. Date: Jul. 5, 2018

(65) Prior Publication Data
US 2019/0359360 A1     Nov. 28, 2019

(30) Foreign Application Priority Data

Dec. 30, 2016  (IT) ........................ 102016000132855

(51) Int. Cl.
*B65B 11/52* (2006.01)
*B65B 7/16* (2006.01)
*B29C 65/74* (2006.01)
*B29C 65/78* (2006.01)
(Continued)

(52) U.S. Cl.
CPC .............. *B65B 11/52* (2013.01); *B65B 7/164* (2013.01); *B29C 65/7461* (2013.01); *B29C 65/7841* (2013.01); *B29L 2031/712* (2013.01); *B65B 31/028* (2013.01)

(58) Field of Classification Search
CPC ....... B65B 11/52; B65B 7/164; B65B 31/028; B29C 65/7461; B29C 65/7841; B29L 2031/712
See application file for complete search history.

(56) References Cited

U.S. PATENT DOCUMENTS 3,509,683 A * 5/1970 Sternau ................... B65B 7/167
 53/442
4,256,791 A * 3/1981 Holmstrom ........... B29C 66/723
 428/77

(Continued)

FOREIGN PATENT DOCUMENTS

EP  2907759 A1 * 8/2015 ....... B29C 66/24244
EP  2907759 A1  8/2015
WO  2014166940 A1  10/2014

*Primary Examiner* — Nathaniel C Chukwurah
*Assistant Examiner* — Lucas E. A. Palmer
(74) *Attorney, Agent, or Firm* — Jon M. Isaacson

(57) ABSTRACT

A packaging apparatus includes a conveyor that moves one or more supports towards a packaging station, while a plastic film to be applied to said one or more supports is simultaneously transported to the packaging station itself. A longitudinally cutting unit longitudinally cuts the plastic film in order to form two or more film strips, and a compensating device exerts a tensioning action on one or more portions of said film strips. A packaging method includes longitudinally cutting the plastic film into strips and compensating to suitably tautly hold the film strips during their movement.

23 Claims, 13 Drawing Sheets

(51) Int. Cl.
*B29L 31/00* (2006.01)
*B65B 31/02* (2006.01)

(56) References Cited

U.S. PATENT DOCUMENTS

| | | | | |
|---|---|---|---|---|
| 5,155,969 A * | 10/1992 | Kuethe | ............... | B65B 31/028 53/329.4 |
| 5,649,412 A * | 7/1997 | Binacchi | ............... | B65B 9/023 53/559 |
| 5,873,218 A * | 2/1999 | Kendig | ............... | B65B 7/2885 53/442 |
| 2002/0110625 A1* | 8/2002 | Garwood | ............ | B65D 81/268 426/392 |
| 2003/0152675 A1* | 8/2003 | Garwood | ............ | B65D 81/267 426/129 |
| 2004/0033382 A1* | 2/2004 | Kendig | ................... | C08J 7/043 428/518 |
| 2005/0155324 A1* | 7/2005 | Gayet | ................. | B29K 2827/18 53/329.5 |
| 2005/0257501 A1 | 11/2005 | Natterer | | |
| 2007/0022717 A1* | 2/2007 | Seggern | ................. | B29C 66/61 53/433 |
| 2008/0148690 A1* | 6/2008 | Seggern | ............... | B65B 31/028 53/433 |
| 2010/0065187 A1* | 3/2010 | Vaillant | ............... | B29C 66/432 156/73.1 |
| 2012/0102882 A1* | 5/2012 | Ehrmann | ............ | B29C 65/7867 53/403 |
| 2012/0144785 A1* | 6/2012 | Vaccari | ................. | B65G 25/02 53/510 |
| 2012/0204516 A1* | 8/2012 | Palumbo | ................. | B65B 41/06 53/403 |
| 2012/0267036 A1* | 10/2012 | Bartoli | .................... | B29C 65/18 156/87 |
| 2012/0272623 A1* | 11/2012 | Osterrieder | ............ | B65B 7/164 53/485 |
| 2013/0074664 A1* | 3/2013 | Ewald | .................. | B65B 61/065 83/13 |
| 2014/0165511 A1* | 6/2014 | Eberle | ...................... | B65B 9/04 53/559 |
| 2015/0021456 A1* | 1/2015 | Buchko | .................. | F16B 17/00 248/637 |
| 2015/0061197 A1* | 3/2015 | Kloeppel | ................ | B29C 51/36 264/549 |
| 2015/0107191 A1* | 4/2015 | Schiavina | ............. | B65B 7/162 53/291 |
| 2016/0068288 A1* | 3/2016 | Palumbo | ................. | B29C 65/30 53/511 |
| 2016/0176598 A1* | 6/2016 | Palumbo | ................. | B65B 9/045 206/497 |
| 2016/0194101 A1* | 7/2016 | Palumbo | ................. | B65B 47/04 53/433 |
| 2016/0355283 A1* | 12/2016 | Capitani | ................ | B29C 65/08 |
| 2019/0185188 A1* | 6/2019 | Palumbo | ................ | B65B 41/10 |

\* cited by examiner

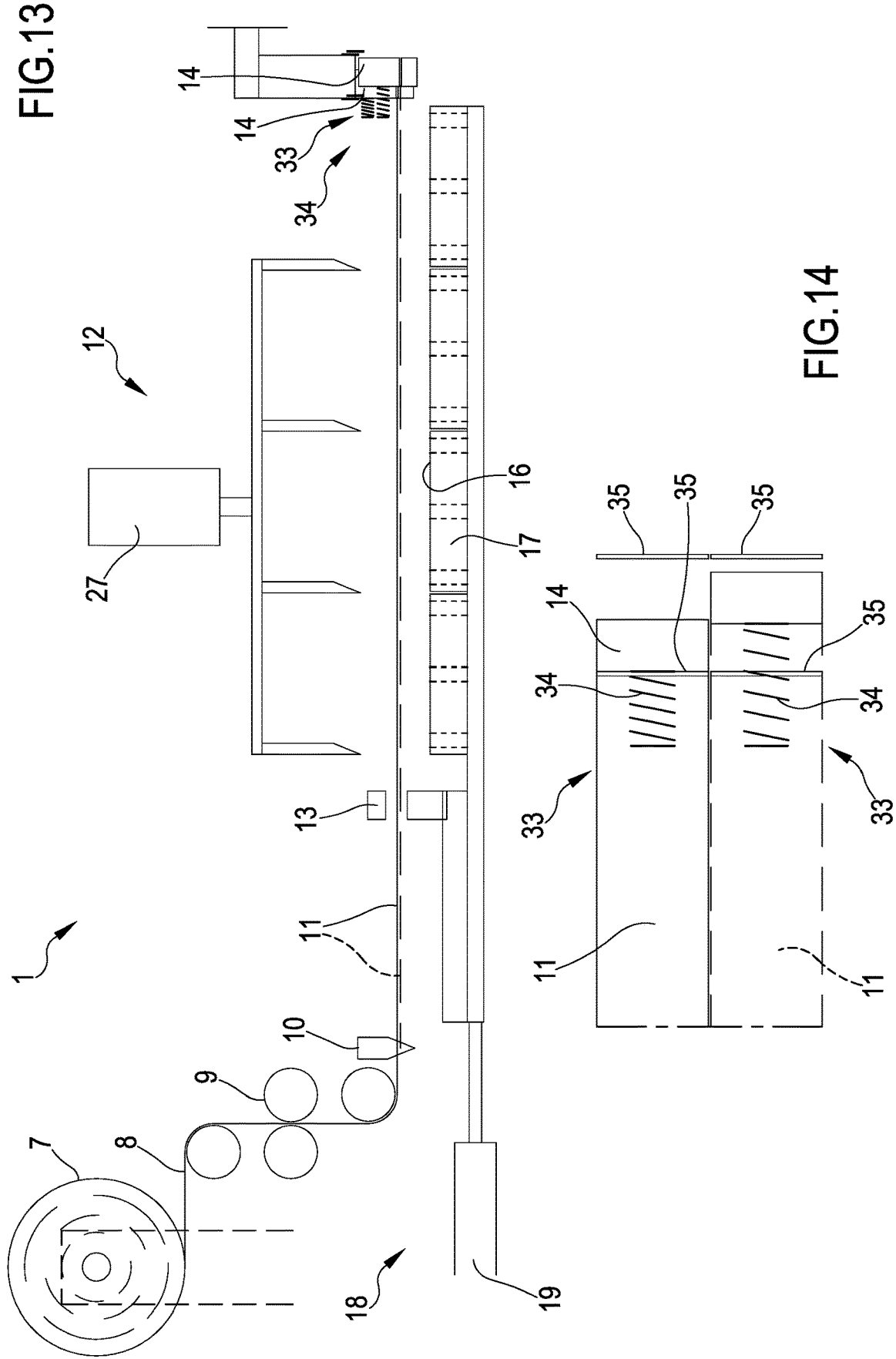

APPARATUS AND METHOD OF PACKAGING A PRODUCT

FIELD OF THE INVENTION

The present invention refers to an apparatus and a method of packaging a product, particularly refers to the vacuum or controlled-atmosphere packaging.

STATE OF THE ART

Among the packaging processes, processes making vacuum packages, and process making controlled-atmosphere packages and processes for simply closing a product inside a package are today known. The known packaging processes, particularly the vacuum packaging and controlled-atmosphere packaging processes, can be used for packaging foods and perishable products such as for example, meat, fish, cheese, ready-to-eat meals, etc.

The vacuum packaging processes make packages by using plastic films: the vacuum packages can be made by only using one or more plastic films suitably disposed around the product to be packaged or by coupling one or more plastic films to an abutment structure (such as a tray, for example) adapted to support the product to be packaged. The vacuum packaging process is substantially a thermoforming process which provides to dispose a product inside or above a rigid or semirigid support defined by a tray, a bowl, or a cup or by another type of support. The support and the associated product are disposed inside a vacuum chamber. Inside the chamber, a thermoplastic film is sealed to an upper edge of the support; then, the air present inside the package is extracted so that the thermoplastic film can adhere to the product disposed inside the support.

The controlled-atmosphere packaging processes provide to dispose a product inside or above a rigid or semirigid support for example defined by a tray, a bowl or a cup or by another type of support. The support and the associated product are disposed inside a chamber wherein a controlled atmosphere is formed (in other words having a composition different from the normal atmospheric composition) and wherein a plastic film is sealed to an upper edge of the support in order to tightly close the product.

In the above described processes, a film of plastic material supplied to a supplying roll for example, is caused to pass through one or more tension adjusting systems and then is supplied to the packaging station for being tightly applied to an associated support/s in order to make a predetermined number of packages.

One of the problems caused by the step of supplying the plastic material, refers to correctly positioning the same and therefore suitably moving it from the supplying roll to the interior of the packaging station, above the respective supports and products to be packaged. In addition to this problem, there are the problems of reducing as much as possible the wasted plastic material and of making the packaging cycle as simple and fast as possible.

In the effort of solving the problems discussed in patents US 2007/0022717 and US 2005/0257501, the continuous plastic film is transported inside the packaging station wherein is cut to the size of the tray by cutting devices provided inside the packaging station itself. This solution makes more complex at least one of the tools present in the packaging station and causes unavoidable waste of materials: indeed, in order to enable to pull and cut the film, the same must have a size greater than the support size.

In order to solve the cited inconveniences, patent WO2014166940, in the name of the same Applicant, discloses an apparatus for packaging a product in a tray, comprising a cutting device active outside the packaging station, for separating a continuous plastic film into discrete sheets, and a transferring device capable of transferring the film sheets cut to size by the cutting device in order to position them above the associated trays present inside the packaging station.

While the apparatus and process described in patent WO2014166940 are a substantial improvement with respect to the above described state of the art, they can be further improved in some aspects.

Particularly, in some cases, the supplying plastic film is separated in two or more longitudinal strips destined to be used for associated rows of trays: in these cases, the supplying plastic film can be relatively wide and not perfectly uniform from the geometrical point of view. In other words, the Applicant has found that the supplying plastic film cannot be perfectly flat and can have, for example, a length varying along the transversal development thereof. In these cases, it was found due to the geometrical irregularity of the film itself that the formed film strips show lengths slightly different from each other if said supplying film is cut in strips before arriving into the packaging chamber. Since the packaging process is a continuous process wherein identical cycles consecutively repeat, possible differences of the longitudinal extension of adjacent film strips entail mistakes in managing and moving the plastic film. Moreover, since the described circumstance can repeat cycle after cycle, the disuniformity of the supplying material can, in the worst cases, entail material buildups which can jeopardize the correct operation of the apparatus by causing interferences with stationary or movable parts of the same and causing, in the worst cases, unacceptable machine downtimes.

OBJECT OF THE INVENTION

Therefore, it is an object of the present invention to substantially solve at least one of the inconveniences and/or disadvantages of the previous solutions.

A first object of the invention consists of providing a packaging apparatus and method capable of efficiently removing air from a package or capable of defining an optimal controlled atmosphere in the interior of the package without the inconveniences of the prior art.

Specifically, it is an object of the invention to provide a packaging process and apparatus capable of minimizing the quantity of the used plastic material, in order to reduce to a minimum the waste while avoiding at the same time the problems of forming material buildups.

A further object of the present invention consists of providing a packaging apparatus and method capable of compensating possible problems caused by plastic films showing dimensional imperfections.

And last but not least, it is an object of the invention to offer a technical solution wherein possible problems caused by the use of plastic films showing geometrical imperfections, are automatically compensated at each cycle in order to avoid conditions which can interfere with a smooth operation of the packaging apparatus and process.

Another ancillary object consists of providing a packaging apparatus and process capable of operating safely and particularly capable of meeting the object of removing air or of generating a controlled atmosphere without compromising the appearance of the packaged final product.

These and other objects, which will better appear in the following description, are substantially fulfilled by a packaging apparatus and method according to what is disclosed in one or more of the attached claims and/or in the following aspects, considered alone or in any combinations with each other or in a combination with anyone of the attached claims and/or in a combination with anyone of the further aspects or characteristics described in the following.

SUMMARY

At least one of the abovementioned objects is met by an apparatus according to one or more of the attached claims of a packaging apparatus.

At least one of the abovementioned objects is also met by a method according to one or more of the attached claims of a packaging method.

The aspects of the invention are described in the following.

In a 1st aspect, it is provided an apparatus (1) for packaging a product (P) disposed on a support (4), said apparatus (1) comprising:
- a frame (2),
- a conveyor (3) engaged with the frame (2) and configured for moving, along a predetermined advancement path (A), one or more supports (4) of a type exhibiting at least a base wall and, optionally, at least one lateral wall emerging from the base wall,
- a supplying station (7) for supplying at least one plastic film to be applied to said one or more supports,
- a packaging station (5) comprising:
  - a lower tool (22) defining a predetermined number of seats for receiving said one or more supports (4) housing respective products (P) to be packaged, and
  - an upper tool (21) configured for coupling portions of said plastic film to said one or more supports for making one or more packages, said packaging station (5) being configured for operating at least under at least a first operative condition, wherein the lower tool and upper tool (22, 21) are distanced from each other, and under a second operative condition, wherein the lower tool and upper tool (22, 21) are approached each other in order to form a packaging chamber (20).

In a 2nd aspect according to the first aspect, the apparatus comprises a longitudinally cutting unit (10) configured for receiving the plastic film from the supplying station (7) as a continuous plastic film (8) and for longitudinally cutting said continuous plastic film (8) for forming two or more film strips (11).

In a 3rd aspect according to anyone of the preceding aspects, the apparatus comprises at least one positioning element (13), movable towards and away from the packaging station (5) and configured for grippingly acting on the film strips (11) and for moving said film strips (11) towards the packaging station (5).

In a 4th aspect according to anyone of the preceding aspects, the apparatus comprises at least one stop element (14), configured for grippingly receiving the film strips (11) moved by the positioning element (13).

In a 5th aspect according to the preceding aspect, the at least one stop element is supported by the packaging station (5), for example by the upper tool, or is borne by the stationary frame in order to exhibit a stationary position in the direction of the movement of the strips (11) with respect to the packaging station (5).

In a 6th aspect according to anyone of the preceding aspects, the apparatus comprises a compensating device (30) configured for exerting a tensioning action on one or more portions of said film strips (11) extending between said longitudinally cutting unit (10) and said positioning element (13).

In a 7th aspect according to the preceding aspect, the compensating device (30) is configured for acting on said positioning element (13).

In an 8th aspect according to the aspect 6 or 7, the compensating device (30) is configured for acting on said stop element (14).

In a 9th aspect according to the aspect 6 or 7 or 8, the compensating device (30) is configured for acting on a longitudinal tract of at least one of said film strips (11) extending between said positioning element (13) and said stop element (14).

In an 11th aspect according to anyone of the preceding aspects, the apparatus comprises a respective compensating device (30) for each film strip (11).

In a 12th aspect according to anyone of the preceding aspects, each compensating device (30) is configured for exerting a differentiated tensioning action on each portion of said strips (11) extending between the longitudinally cutting unit (10) and the positioning element (13).

In a 13th aspect according to anyone of the preceding aspects, the apparatus comprises a transversally cutting unit (12) configured for receiving said film strips (11) and transversally cutting said film strips (11) in order to form a plurality of film discrete sheets, the stop element (14) being configured for grippingly acting on each film strip (11) when the positioning element (13) is in a position approached the packaging station (5) and being disposed so that a longitudinal tract of each film strip (11) extends at the transversally cutting unit (12).

In a 14th aspect according to anyone of the preceding aspects, the apparatus comprises a transferring device (18) for transferring the discrete sheets (15), comprising an abutment structure (17) movable back and forth along a predetermined operative stroke and configured for receiving said discrete sheets (15) and moving them from a position outside the packaging station (5) to a position inside the packaging station.

In a 15th aspect according to anyone of the preceding aspects, said upper tool (21) is configured for receiving film discrete sheets (15) from the abutment structure (17) placed in said position inside the packaging station.

In a 16th aspect according to anyone of the preceding aspects, wherein the positioning element (13) comprises a respective positioning element (13) for each film strip (11), each positioning element (13) being configured for grippingly acting on a respective film strip (11) and for moving a free edge of the strip itself from a position away from the packaging station (5) to a position approached the packaging station (5).

In a 17th aspect according to the preceding aspect, the compensating device (30) comprises a respective compensating device (30) active on each positioning element (13) for exerting said differentiated tensioning action on each film strip (11).

In an 18th aspect according to anyone of the preceding aspects, each stop element (14) is configured for grippingly acting on each film strip (11) when the positioning element (13) is in a position approached the packaging station (5).

In a 19th aspect according to the preceding aspect, each stop element (14) is supported by the packaging station, optionally by the upper tool (21), or by the frame (2), so that—when the positioning element (13) is in a position approached the packaging station—said positioning element (13) is immediately adjacent the stop element (14) and is capable of releasing to said latter free edge of each strip (11).

In a 20th aspect according to one of the two preceding aspects, the compensating device (30) comprises a respective compensating device (30) active on each stop element (14) for exerting said differentiated tensioning action on each film strip.

In a 21st aspect according to anyone of the preceding aspects, the transferring device (18) comprises at least one first actuator (19) configured for moving the abutment structure (17) of the discrete sheets between said position outside the packaging station and said position inside the packaging station.

In a 22nd aspect according to anyone of the preceding aspects, the positioning element (13) is supported by the abutment structure (17) of the device for transferring the discrete sheets and is movable with respect to this latter by an action of a second actuator (26).

In a 23rd aspect according to anyone of the preceding aspects, the transversally cutting unit (12) comprises at least one third actuator (27) configured for moving one or more blades of the transversally cutting unit (12) between a rest position, wherein the one or more blades do not interfere with the film strips (11), and an active position, wherein the one or more blades are predisposed to transversally cut the film strips (11) in order to form the plurality of film discrete sheets (15).

In a 24th aspect according to anyone of the preceding three aspects, the apparatus comprises at least one control unit (100) connected to the first, second and third actuators (27) and is configured for:
  commanding the first actuator (19) to move the abutment structure (17) along a first direction from the external position to the position inside the packaging station,
  commanding the second actuator (26) to impart to the positioning element (13) a relative motion with respect to the abutment structure (17) along a second direction opposite to the first direction, the relative motion imparted to the positioning element (13) along the second direction and the motion imparted to the abutment structure (17) along the first direction globally causing the positioning element (13) to approach the stop element (14),
  once the abutment structure (17) has reached the position inside the packaging station (5) and the positioning element (13) is approached the stop element (14), commanding the stop element (14) to grippingly act on the film strips (11), commanding the positioning element (13) to release the film strips (11), and commanding the upper tool to take the discrete sheets from the abutment structure (17),
  while the stop element (14) is gripping said film strips (11) and the stop element (14) is releasing the film strips (11) themselves, commanding the first actuator (19) to move the abutment structure (17) and positioning element (13) along a third direction opposite to the first direction, bringing the abutment structure (17) to said position outside the packaging station (5),
  commanding the second actuator (26) to impart to the positioning element (13) a relative motion with respect to the abutment structure (17) along a fourth direction opposite to said third direction until the positioning element (13) is placed adjacent said abutment structure (17) so that a longitudinal tract of said film strips (11) extending between said positioning element (13) and said stop element (14) is disposed at—preferably above—said abutment structure (17) and at—preferably below—the blades of said transversally cutting unit (12),
  commanding the third actuator (27) to move the one or more blades of the transversally cutting unit (12) to an active position and transversally cutting the film strips (11) in order to form the plurality of discrete film sheets positioned above the abutment structure (17).

In a 25th aspect according to anyone of the preceding aspects, each positioning element (13) comprises at least one first and one second gripping portions relatively movable from each other between a gripping condition, wherein the first and second gripping portions are approached each other and configured for grippingly acting on a portion of said film strips (11), and a releasing condition, wherein the first and second gripping portions are distanced from each other in order to enable the positioning element (13) to freely slide with respect to the film strips (11).

In a 26th aspect according to the preceding aspect, the compensating device (30) comprises a command member (31) active on the positioning element (13) and configured for positioning the first and second gripping portions in said gripping condition, in said releasing condition and, further, in an intermediate condition between said gripping condition and said releasing condition; wherein in said intermediate condition, the first and second gripping portions are configured for contacting said film strips (11) in order to enable the positioning element (13) to forcedly slide with respect to the film strips (11) themselves.

In a 27th aspect according to anyone of the preceding three aspects, the control unit is also configured for:
  commanding said command member (31) and bringing the first and second gripping portions of the positioning element (13) to said intermediate condition, and
  maintaining in said intermediate condition the first and second portions of the positioning element (13), commanding the second actuator (26) to impart to the positioning element (13) the relative motion with respect to the abutment structure (17) along the fourth direction in order to exert said tensioning action on said longitudinal portion of said film strips (11), which extends between the longitudinally cutting unit (10) and said positioning element (13) and therefore pulling and laying one or more portions of the film strips (11), extending between said longitudinally cutting unit (10) and said positioning element (13) during the relative motion of the positioning element (13) with respect to the abutment structure (17) along said fourth direction.

In a 28th aspect according to anyone of the preceding aspects, the compensating device (30) comprises at least one respective thrusting member (32) configured for directly thrustingly acting on the surface of the longitudinal tract of at least one of said film strips (11), extending between said positioning element (13) and said stop element (14), preferably wherein the compensating device (30) comprises a respective thrusting member (32) configured for directly acting on the surface of the longitudinal tract of each of said film strips (11) extending between said positioning element (13) and said stop element (14).

In a 29th aspect according to the preceding aspect, the thrusting member (32) is movable between a non-operative condition, wherein said thrusting member does not act on any film strip, and an operative condition, wherein the at least one thrusting member acts on the longitudinal tract of at least one of said strips disposed between the positioning element (13) and stop element (14).

In a 30th aspect according to the preceding aspect, the control unit (100) is configured for commanding said thrusting member to move to said operative condition before commanding the third actuator (27) and transversally cutting the film strips (11) in order to form the plurality of film discrete sheets.

In a 31st aspect according to anyone of the preceding aspects, the apparatus comprises at least one stop element (14) for each film strip (11), each stop element (14) being configured for grippingly receiving the free edge of a respective strip (11) when the positioning element (13) is in a position approached the packaging station.

In a 32nd aspect according to the preceding aspect, the compensating device (30) comprises a regulator (33) active on each of said stop elements and configured for moving the respective stop element (14) away from the positioning element (13) for exerting a pulling action on the film strips (11).

In a 33rd aspect according to the preceding aspect, the regulator (33) is displaceable between a non-operative condition wherein is not active on the respective stop element (14) and an operative condition wherein it acts on the respective stop element (14).

In a 34th aspect according to the preceding aspect, the control unit (100) of the apparatus (1) is configured for commanding said regulator to move to said operative condition before commanding the third actuator (27) and transversally cutting the film strips (11) to form the plurality of film discrete sheets.

In a 35th aspect according to anyone of the preceding aspects from 23 to 34, the control unit (100) is configured for commanding the third actuator (27) to move the one or more blades of the transversally cutting unit (12) to the active position and transversally cutting the film strips (11) in order to form the plurality of film discrete sheets positioned above the abutment structure (17), after the/each stop element (14) has completed the relative motion with respect to the abutment structure (17) along the fourth direction and maintaining each/the positioning element (13) and each/the stop element (14) grippingly on said strips.

In a 36th aspect according to anyone of the preceding aspects, the lower tool (22) defines at least one positioning seat configured for receiving one or more supports (4), and wherein in said first operative condition, the lower tool and upper tool (22, 21) are distanced from each other in order to enable the film discrete sheets to enter the packaging station of said abutment structure (17) for the film discrete sheets; and wherein in said second operative condition, the lower and upper tools (22, 21) are approached and define at least one fluid tight closed packaging chamber (20).

In a 37th aspect according to anyone of the preceding aspects, the apparatus comprises a rolls tension regulating unit (9) positioned between the supplying station (7) and longitudinally cutting unit (10) and wherein the rolls of the regulating unit (9) comprise at least one dancer roll and are active on said continuous film.

In a 38th aspect according to anyone of the preceding aspects, the apparatus comprises at least one penetrating tool associated to the packaging station and adapted to operate inside said packaging chamber, the penetrator tool being configured for displacing between a rest position and an active position wherein is capable of drilling a wall of said support positioned in the lower tool.

In a 39th aspect according to anyone of the preceding aspects, the apparatus comprises a suctioning system or a controlled atmosphere generating system connected to the packaging chamber and, optionally, to a channel present in the optional penetrating tool.

In a 40th aspect according to the preceding aspect, the control unit (100) is connected to the packaging station, and optionally an auxiliary actuator is active on the penetrating tool, said control unit (100) being configured for:
  if the penetrating tool is present, commanding to position the penetrating tool in the operative position,
  commanding the packaging station to tightly constrain each film sheet to the respective support (4),
  commanding the suctioning system (28) or the controlled atmosphere generating system to remove the air from the packaging chamber or respectively injecting a gas in the packaging chamber, optionally also through the channel of the penetrating tool—still more optionally also after tightly constraining the sheets on the support (4).

A 41st aspect of the invention refers to a method of packaging a product.

In a 42nd aspect according to the aspect 41, the method uses an apparatus according to anyone of the preceding aspects or according to anyone of the attached claims.

In a 43rd aspect according to anyone of the preceding two aspects, said method comprises:
  moving one or more supports (4) on which at least one respective product (P) is placed, along a predetermined advancement path (A), to a packaging station (5),
  receiving a continuous plastic film (8) continuous at a longitudinally cutting unit,
  longitudinally cutting, in said longitudinally cutting unit (10), the continuous plastic film (8) in order to form two or more film strips (11),
  moving the film strips (11) towards the packaging station (5),
  making, inside the packaging station, one or more packages.

In a 44th aspect according to the preceding aspect, the method comprises a compensating step comprising exerting a tensioning action on one or more portions of said film strips (11) disposed between said longitudinally cutting unit (10) and said packaging station.

In a 45th aspect according to the preceding aspect, exerting a tensioning action comprises exerting a differentiated tensioning action on each portion of said strips extending between the longitudinally cutting unit (10) and the positioning element (13).

In a 46th aspect according to anyone of the preceding three aspects, the step of moving the film strips (11) comprises:
  engaging a free edge of each of said strips with a positioning element (13), movable towards and away with respect to the packaging station, and moving said free edge of said film strips (11) towards the packaging station;
  receiving the free edge of said strips by a stop element (14) associated to the packaging station.

In a 47th aspect according to anyone of the preceding four aspects, the tensioning action on each of said strips is performed by executing at least one of the following steps:
  acting on the positioning element (13) for causing the portions of strips to be tensioned between the longitudinally cutting unit (10) and positioning element (13),
  acting on the stop element (14) for causing the portions of strips to be tensioned between the longitudinally cutting unit (10) and stop element (14), thrustingly acting on a surface of a longitudinal tract of at least one of said film strips (11) extending between said positioning element (13) and said stop element (14) for causing the portions of strips portions (11) to be tensioned between the longitudinally cutting unit (10) and positioning element (13).

The actions according to this aspect can be also combined two by two or all three together.

In a 48th aspect according to anyone of the aspects from 41 to 47, the method comprises:
transversally cutting said film strips (11) in the transversally cutting unit (12) in order to form a plurality of film discrete sheets, optionally wherein each of the sheets is cut as a function of the respective support,
disposing the film discrete sheets (15) on an upper surface (16) of an abutment structure (17) of a transferring device (18), said abutment structure (17) being movable back and forth along a predetermined operative stroke and is configured for receiving said discrete sheets and moving them from a position outside the packaging station and a position inside the packaging station (5),
moving the abutment structure (17) in order to take the discrete sheets, present on said upper surface (16) to the interior of the packaging station,
withdrawing by means of an upper tool of the packaging station, said film discrete sheets from the abutment structure (17) disposed in said position inside the packaging station,
making, inside the packaging station (5), one or more packages by fluid tightly coupling each of said film discrete sheets to at least one respective support.

In a 49th aspect according to the preceding aspect, each positioning element (13) is supported by the abutment structure (17) of the transferring device (18) of the discrete sheets (15) and wherein the process provides to:
move the abutment structure (17) of the discrete sheets along a first direction from the external position to the position inside the packaging station,
simultaneously with the movement of the abutment structure (17) along the first direction and maintaining the positioning element (13) grippingly on said film strips (11), impart to the positioning element (13) a relative motion with respect to the abutment structure (17) along a second direction opposite to the first direction, the relative motion imparted to the positioning element (13) along the second direction and the motion imparted to the abutment structure (17) along the first direction, generally causing the positioning element (13) to approach the stop element (14) and the film strips (11) to advance towards the packaging station,
once the abutment structure (17) has reached the position inside the packaging station and the positioning element (13) is approached the stop element (14), perform the following further operations: take the film strips (11) by the stop element (14), release the film strips (11) by the positioning element (13), and by means of the upper tool, withdrawing the discrete sheets from the abutment structure (17),
by the stop element (14) grippingly on said film strips (11) and by the positioning element (13) which has released the film strips (11) themselves, move the abutment structure (17) and the positioning element (13) along a third direction opposite to the first direction, in order to bring the abutment structure (17) to said position outside the packaging station,
impart, preferably after the abutment structure (17) has returned to the position outside the packaging station, to the positioning element (13) a relative motion with respect to the abutment structure (17) along a fourth direction opposite to said third direction until the positioning element (13) is placed adjacent said abutment structure (17) so that a longitudinal tract of said film strips (11), which extends between said positioning element (13) and said stop element (14), is disposed at—preferably above—said abutment structure (17) and at—preferably below—blades of the transversally cutting unit (12),
bringing the positioning element (13) again to grip the film strips (11) and, while the positioning element (13) is gripping said strips, move one or more blades of the transversally cutting unit (12) to the active position and transversally cut the film strips (11) in order to form the plurality of film discrete sheets positioned above the abutment structure (17).

In a 50th aspect according to anyone of the preceding aspects from 46 to 49, each positioning element (13) comprises at least one first and one second gripping portions movable with respect to each other between a gripping condition, wherein the first and second gripping portions are approached each other and are configured for grippingly acting on a portion of said film strips (11), and a releasing condition wherein the first and second portions are spaced from each other in order to enable the gripping element to freely slide with respect to the film strips (11).

In a 51st aspect according to the preceding aspect, the compensating step comprises:
positioning the first and second gripping portions of the positioning element (13) in an intermediate condition between said gripping condition and said releasing condition, wherein the first and second gripping portions contact said film strips (11) in order to enable the gripping element to forcedly slide on the film strips (11),
by maintaining the first and second gripping portions of the positioning element (13) in an intermediate condition, performing said relative motion of the positioning element (13) along said fourth direction opposite to said third direction so that during the relative motion along the fourth direction, the positioning element (13) exerts the tensioning action on the portion of the strips, disposed between the longitudinally cutting unit (10) and the positioning element (13) itself, in order to lay in this way the one or more portions of strips disposed between the longitudinally cutting unit (10) and the positioning element (13).

In a 52nd aspect according to anyone of the aspects from 44 to 51, the compensating step comprises acting on a thrusting member (32), preferably a respective thrusting member, so that it thrustingly directly acts against the surface of each longitudinal tract of said film strips (11), extending between said positioning element (13) and said stop element (14), said thrusting member (32) thrustingly acting on the respective longitudinal tract of said strips, while the positioning member does not grippingly act on said strips for exerting a tensioning action on the longitudinal portion of said film strips (11), extending between the longitudinally cutting unit (10) and said positioning element (13) and therefore laying one or more portions of film strips (11), extending between said longitudinally cutting unit (10) and said positioning element (13).

In a 53rd aspect according to anyone of the aspects from 44 to 52, the compensating step comprises regulating the longitudinal position of a stop element (14), preferably regulating the longitudinal position of each respective stop element (14) for each film strip, each stop element (14) being configured for grippingly receiving the free edge of a respective strip when the positioning element (13) is in a position approached the packaging station, and wherein the compensating step comprises moving the respective stop element (14) away from the positioning element (13) for exerting a tensioning action on the film strips (11), wherein the positioning element (13) does not grippingly act on said strips during the compensating step for exerting a tensioning action on the longitudinal portion of said film strips (11), extending between the longitudinally cutting unit (10) and said positioning element (13) and therefore laying one or more portions of film strips (11), extending between said longitudinally cutting unit (10) and said positioning element (13).

In a 54th aspect according to anyone of the aspects from 44 to 53, the compensating step is performed before transversally cutting the film strips (11) in order to form the plurality of film discrete sheets (15).

In a 55th aspect according to anyone of the aspects from 41 to 54, making one or more packages by fluid tightly coupling each of said discrete film sheets (15) to at least one respective support (4), comprises:

tightly constraining each film sheet (15) to at least a perimetral edge of a respective support (4), removing a gas from a packaging chamber (T) defined inside the packaging station, optionally wherein it is provided to drill the support by a drilling tool operating in said packaging station, and extracting the gas also through a channel present in the drilling tool once the film portion is fixed to the respective support, extracting the packaged product from the packaging station.

BRIEF DESCRIPTION OF THE DRAWINGS

Some embodiments and some aspects of the invention will be described in the following with reference to the attached drawings given only in an indicative and therefore non-limiting way, wherein.

Figure 1:
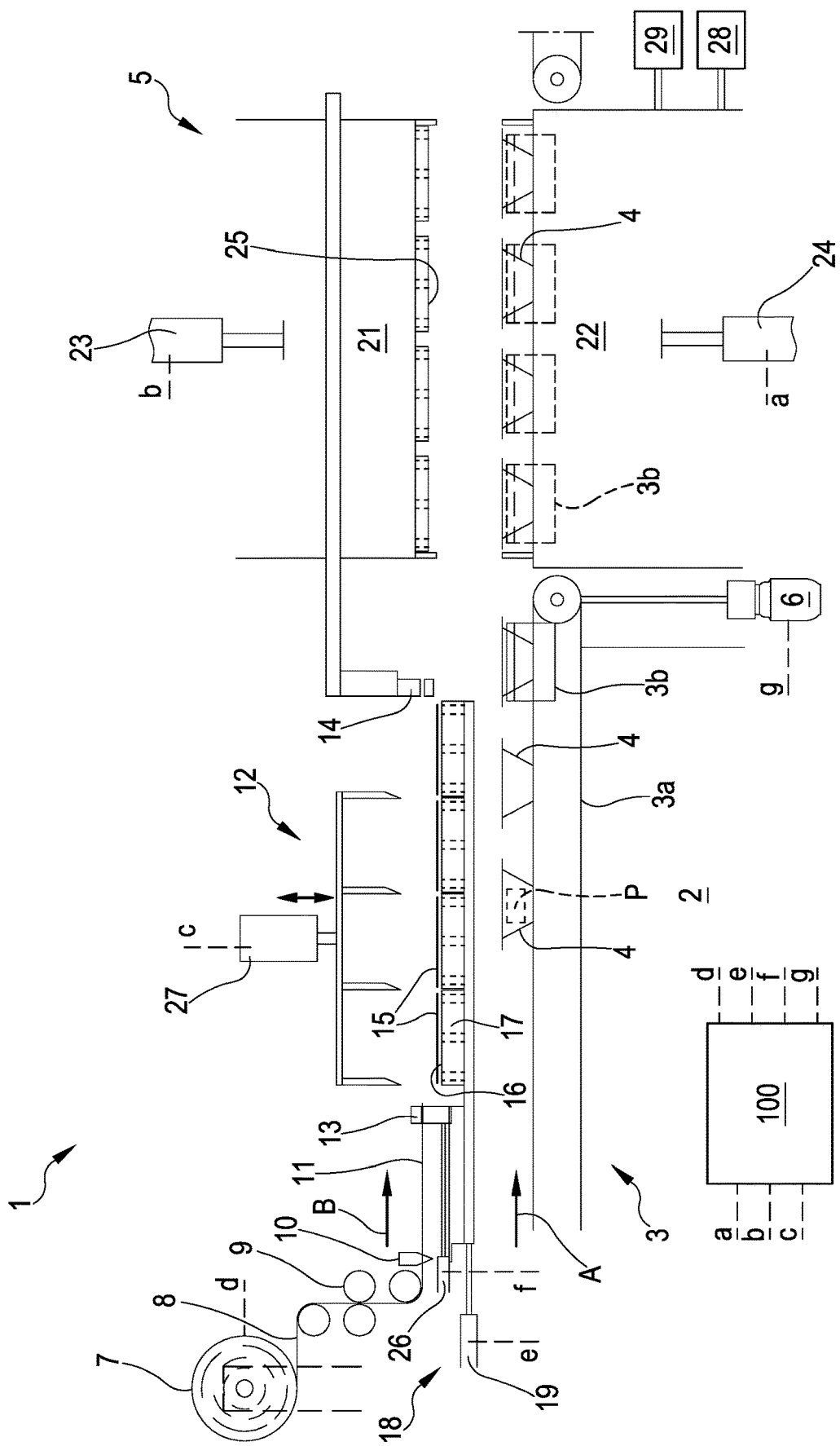
FIG. 1 is a schematic view of a packaging apparatus according to the present invention, wherein a film is unwound from a reel and longitudinally separated, while a supporting structure bears a plurality of sheets destined to be sealed, for example heat-sealed, on a respective support carried by a conveyor.
Figure 11:
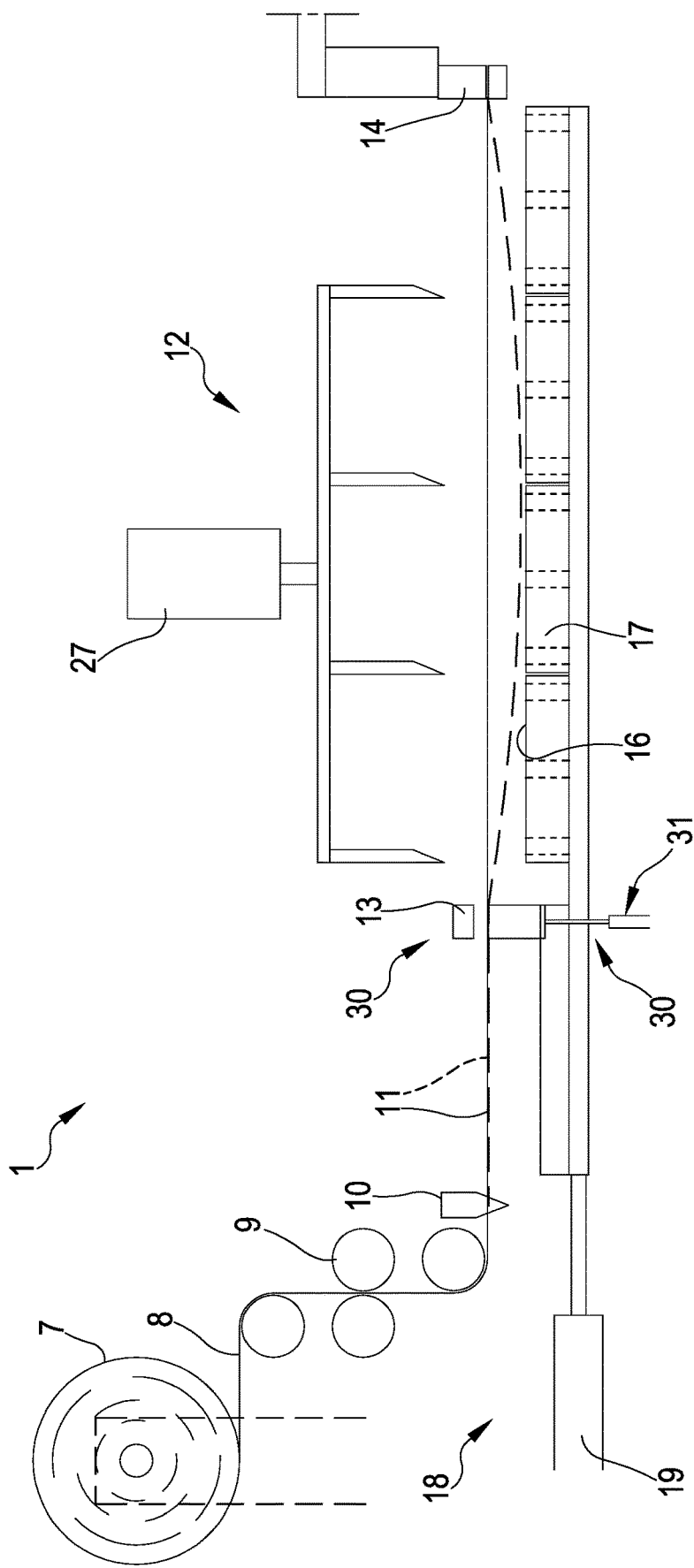
Figure 12:
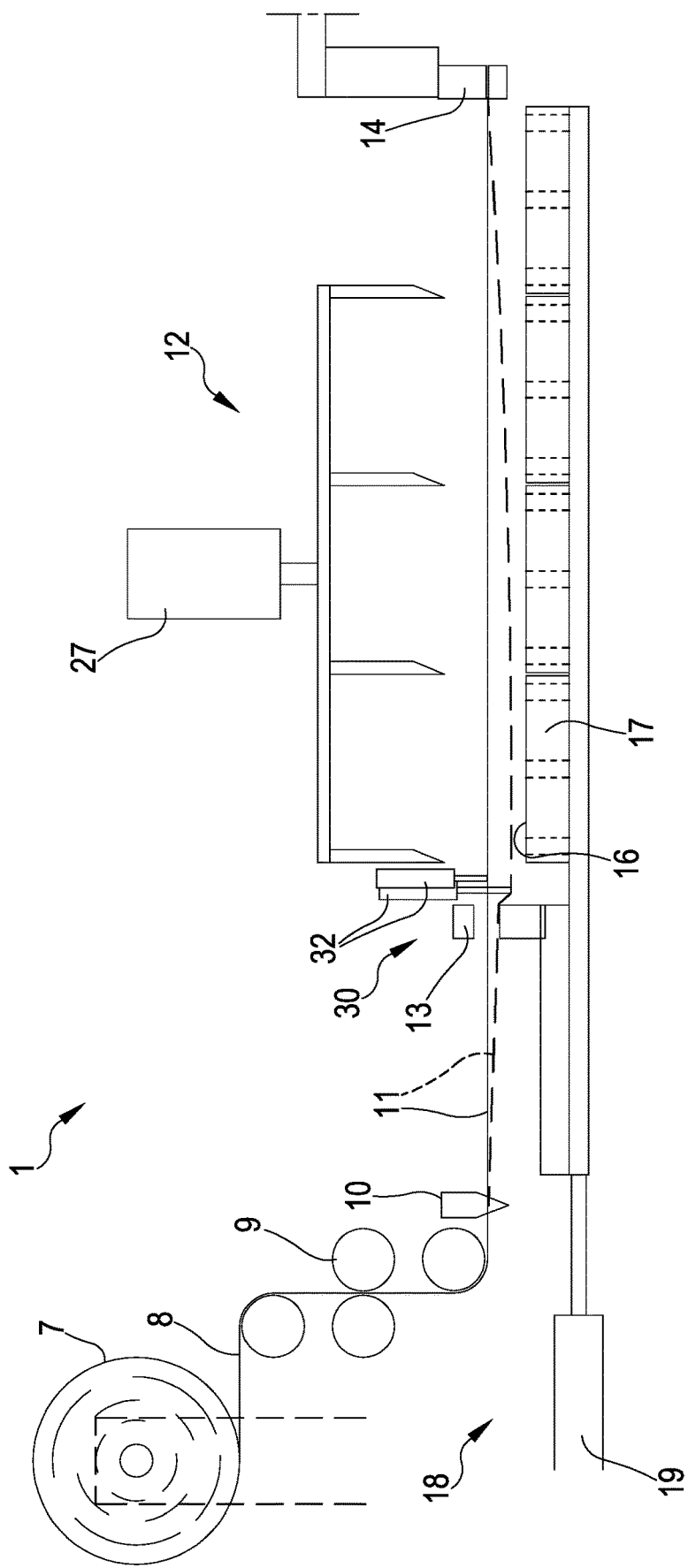

FIGS. from 2 to 10 are schematic views of the apparatus in FIG. 1 during following operative steps of forming film discrete sheets, of transporting the same and respective trays to a packaging station, and of making finished packages;

FIG. 11 is a schematic representation of a portion of the apparatus 1 wherein a compensating device according to a first variant of the invention is present;

FIG. 12 is a schematic representation of a portion of the apparatus 1 wherein a compensating device according to a third variant of the invention is present;

FIG. 13 is a schematic representation of a portion of the apparatus 1 wherein a compensating device according to a second variant of the invention is present; and FIG. 14 shows a plan view of a portion of FIG. 13 regarding the compensating device.

CONVENTIONS

It is observed that in the present detailed description, corresponding parts illustrated in the several figures are indicated by the same numeral references. The figures could illustrate the object of the invention by not-to-scale representations; therefore, parts and components illustrated in the figures, regarding the object of the invention, could only refer to schematic representations.

The terms "upstream" and "downstream", if used with reference to trays or supports, refer to an advancement direction of the trays or supports along an advancement path extending from a starting station through a packaging station and therefore to a packages unloading station.

Analogously, the terms "upstream" and "downstream", when used with reference to a continuous plastic film or to plastic film sheets, refer to an advancement direction of the film along an advancement path extending from a continuous film supplying station, through a film cutting station, then to the packaging station and finally to the packages unloading station.

Definitions

The Product

The term "product" means an article or a composite of articles of any type. For example, the product can be of a food-type at the solid, liquid or gel state, in other words it can be in two or more of said aggregation states. In the food field, the product can comprise; meat, fish, cheese, treated food products such as treated meat or fish, ready-to-eat meals, and frozen food.

The Control Unit

The packaging apparatus, herein described and claimed, comprises at least one control unit responsible for controlling the operations implemented by the apparatus. The control unit can be a single unit or can be formed by a plurality of distinct control units according to design choices and operative needs. The term "control unit" means an electronic-type component which can comprise at least one of: a digital processor (CPU), a memory (or memories), an analog-type circuit, or a combination of one or more digital processing units with one or more analog-type circuits. The control unit can be "configured" or "programmed" for performing some steps: this can be physically made by any means enabling to configure or program the control unit. For example, in case of a control unit comprising one or more CPUs and one or more memories, one or more programs can be stored in suitable memory banks connected to the CPU or CPUs; the program or programs contain instructions which, when are executed by the CPU or CPUs, program or configure the control unit so that it executes the operations described with reference to the control unit. Alternatively, if the control unit is or comprises an analog-type circuitry, then the circuit of the control unit can be designed for including a circuitry configured, in use, for processing electrical signals in order to perform the steps regarding the control unit.

The Support

The term "support" identifies both a substantially flat supporting element, particularly devoid of lateral walls, adapted to substantially define a flat base on which one or more products abut, and a tray comprising at least one base—for example substantially flat or convex—and at least one lateral wall emerging from the external perimeter of the base, for defining a container at least open at the top; the tray defines a volume the interior thereof can receive the product. Moreover, the tray can comprise an upper edge portion radially emerging from a free edge of the lateral wall opposite to the base: the portion of the upper edge emerges from the lateral wall according to a direction exiting from the volume of the tray itself.

The support can exhibit a base the perimeter thereof having a rectangular, diamond, circular or elliptical shape.

The support can be formed by a specific and distinct making process or can be made in-line to a packaging process.

The support can be made at least partially of a paper sheet material. The term "paper material" means paper or paperboard; particularly, the sheet material useable for making the support can comprise a grammage comprised between 50 and 600 g/m², particularly comprised between 100 and 500 g/m², still more particularly between 150 and 400 g/m². The paper material of interest extends between a first and second prevalent development surfaces. The sheet paper material used for making the support can, in an embodiment variant, be covered for at least part of the first and/or second prevalent development surfaces by a covering of plastic material, for example a food-grade film. In case the covering is disposed so that it covers at least part of the first prevalent development surface, the covering itself will define an internal surface of the support. On the contrary, in case the covering is disposed on the second prevalent development surface, the covering itself will define an external surface of the support. Moreover, the covering can be thermally treated so that it can act as an element for engaging and fixing portions of the support as will be better described in the following. Moreover, the covering can be used for defining a kind of water and/or moisture barrier useful to avoid to weaken the support and to prevent a loss of structurality thereof with a following uncontrolled deformation of the paper material forming this latter component. The covering can be applied to the paper material (as hereinbefore specified on the internal and/or external sides of the support) made of a known "coating" or lacquer having a thickness generally comprised between 20 and 400 μm, particularly between 30 and 200 μm, still more particularly between 30 and 80 μm. Advantageously, but in a non-limiting way, the coating can comprise an extrusion-coating on one or both (internal and/or external sides) of the paper material defining the support with thicknesses which can vary from 20 to 400 μm for example, particularly from 30 to 200 μm, still more particularly from 30 to 80 μm, of the coating material (in other words of polythene). The coating plastic material can be for example selected among the following materials: LDPE, HDPE, PP, PE, polyesters, PVdC.

As an alternative, the support can be made at least partially of mono-layer and multi-layer thermoplastic materials. Preferably, the support is provided with gas barrier properties. This term, as herein used, refers to a film or sheet of a material having an oxygen transmission rate less than 200 cm³/m²-day-bar, less than 150 cm³/m²-day-bar, less than 100 cm³/m²-day-bar, when measured according to the standard ASTM D-3985 at 23° C. and with a relative humidity of 0%.

Gas barrier materials adapted for mono-layer thermoplastic containers are polyesters, polyamides and similar, for example.

Preferably, the support is made of a multi-layer material comprising at least one gas barrier layer and at least one heat sealable layer for enabling to seal the coating film to the support surface. The gas barrier polymers which can be used as gas barrier layer are PVDC, EVOH, polyamides, polyesters and mixtures thereof. PVDC is any vinylidene chloride copolymer wherein a main amount of the copolymer comprises vinylidene chloride and a minor amount of the copolymer comprises one or more unsaturated monomers co-polymerizable with it, typically vinyl chloride and alkyl acrylates or methacrylates (for example methylacrylates or methacrylates) and mixture thereof with several proportions. Generally, a barrier layer of PVDC will contain plasticizers and/or stabilizers as it is known in the art. The term "EVOH", as herein used, includes saponified or hydrolyzed ethylene-vinylacetate copolymers and refers to ethylene/vinyl alcohol copolymers having a content of ethylene co-monomer preferably consisting in a percentage between about 28 and about 48 moles %, more preferably between about 32 and about 44 moles % of ethylene and still more preferably, and a saponification degree of at least 85%, preferably of at least 90%.

The term "polyamides" refers to omo- and co- or ter-polymers. This term specifically includes aliphatic polyamides or co-polyamides, for example 6-polyamide, 11-polyamide, 12-polyamide, 66-polyamide, 69-polyamide, 610-polyamide, 612-polyamide, 6/9 co-polyamide, 6/10 co-polyamide, 6/12 co-polyamide, 6/66 co-polyamide, 6/69 co-polyamide, aromatic polyamides or co-polyamides and partially aromatic, as 6I-polyamide, 6I/6T polyamide, MXD6 polyamide, MXD6/MXDI polyamide, and mixtures thereof.

The term "polyesters" refers to polymers obtained by a polycondensation reaction of dicarboxylic acids with dihydroxylic alcohols. Suitable dicarboxylic acids are for example, terephthalic acid, isophthalic acid, dicarboxylic 2,6-naphtalene acid, and similar. Suitable dihydroxylic alcohols are, for example, ethylene glycol, diethylene glycol, 1,4-butanediol, 1,4-cyclohexanedimethanol and similar. Examples of useful polyesters include terephthalate polyethylene and copolyesters obtained by a reaction of one or more carboxylic acids with one or more dihydroxylic alcohols.

The thickness of the gas barrier layer preferably will be set for providing the material of which the support is made, with an oxygen transmission rate at 23° C. and with a relative humidity of 0%, less than 50, preferably less than 10 cm³/m².d.atm, when measured according to the standard ASTM D-3985.

Generally, the heat sealable layer will be selected among polyolefins, such as ethylene omo- or co-polymers, propylene omo- or copolymers, ethylene/vinyl acetate copolymers, ionomers and omo- or co-polyesters, for example PETG, a glycol-modified terephthalate polyethylene. The term "co-polymers" as herein used, means a polymer obtained by two or more types of monomers and includes ter-polymers. The ethylene omo-polymers include high density polyethylene (HDPE) and low density polyethylene (LDPE). Ethylene copolymers include ethylene/alpha-olefin copolymers and unsaturated ethylene/ester copolymers. The ethylene/alpha-olefin copolymers generally include ethylene copolymers and one or more comonomers selected from alpha-olefins having 3-20 carbon atoms, such as 1-butene, 1-pentene, 1-hexene, 1-octene, 4-methyl-1-pentene and similar.

The ethylene/alpha-olefin copolymers have generally a density in the range from about 0.86 to about 0.94 g/cm³. Generally, the term linear low density polyethylene (LLDPE) includes a group of ethylene/alpha-olefin copolymers falling in the density range from about 0.915 to about 0.924 g/cm³, and particularly from about 0.915 to about 0.925 g/cm³. Sometimes, the linear polyethylene in the density range from about 0.926 to about 0.94 g/cm³ is known as linear medium density polyethylene (LMDPE). The ethylene/alpha-olefin copolymers having a lower density are known as very low density polyethylene (VLDPE) and ultra low density polyethylene (ULDPE). The ethylene/alpha-olefin copolymers can be obtained by heterogeneous or homogeneous polymerization processes. Another useful ethylene copolymer is an unsaturated ethylene/ester copolymer which is the ethylene copolymer and one or more unsaturated ester monomers. Useful unsaturated esters include vinyl esters of aliphatic carboxylic acids, wherein the esters have from 4 to 12 carbon atoms, such as vinylacetate and alkyl esters of acrylic or methacrylic acid, wherein the esters have from 4 to 12 carbon atoms. The ionomers are copolymers of an ethylene and an unsaturated mono-carboxylic acid having the carboxylic acid neutralized by a metal ion, such as zinc or, preferably, sodium. Useful propylene copolymers include propylene/ethylene copolymers which are propylene and ethylene copolymers containing mainly propylene and propylene/ethylene/butene ter-polymers by percentage weight, which are propylene, ethylene and 1-butene copolymers.

Additional layers, such as adhesive layers, for example for better adhering the gas barrier layer to the adjacent layers, can be preferably present in the material forming the support and are selected based on specific resins used for the gas barrier layer.

In case of a multi-layer structure, portion thereof can be formed as a foam. For example, the multi-layer material used for forming the support can comprise (from the outermost layer to the innermost layer contacting the food) one or more structural layers, typically made of a material such as foamed polystyrene, foamed polyester or foamed polypropylene, or paperboard, or a cast sheet for example of polypropylene, polystyrene, poly(vinyl chloride), polyester, a gas barrier layer and a heat sealable layer.

An easily-openable frangible layer can be placed adjacent the heat sealable layer for making easier to open the final package. Mixtures of polymers having a low cohesive strength which can be used as a frangible layer are described in document WO99/54398, for example. The overall thickness of the support will typically amount, in a non-limiting way, to 5.00 mm, preferably is comprised between 0.04 and 3.00 mm, and more preferably between 0.05 and 1.50 mm, still more preferably between 0.15 and 1.00 mm.

The support can be integrally made of paper material (optionally the coating is of a plastic material film) or can be integrally made of plastic material. In a further embodiment variant, the support is at least partially made of paper material and at least partially of plastic material; particularly, the support is internally made of plastic material and externally coated at least partially by a paper material.

In a further embodiment variant, the support can be at least partially made of a metal material, particularly of aluminum. Moreover, the support can be at least partially made of aluminum and at least partially of paper material.

Generally, the support can be made of at least one the following materials; metal, plastic, paper.

Skin or Film

A film or skin is applied to the tray in order to obtain a fluid-tight package housing the product.

Since the object consists of obtaining a vacuum package, the film applied to the support is typically a flexible multi-layer material comprising at least one first external heat sealable layer capable of being sealed to the internal surface of the tray, optionally a gas barrier layer and a second heat-resistant external layer. The polymers used in said multi-layer material should be easily formable since the film must be stretched and softened by the contact with the heating plate before being laid on the product and support. The film must be laid on the product in order to conform to the shape thereof and possibly to the internal shape of the support. The heat sealable external layer can comprise any polymer capable of being sealed to the internal surface of the tray. Polymers adapted to the heat sealable layer can be ethylene omo- and co-polymers, such as LDPE, ethylene/alpha-olefin copolymers, ethylene/acrylic acid copolymers, ethylene/methacrylic acid copolymers or ethylene/vinylacetate copolymers, ionomers, co-polyesters, for example PETG. The preferred materials for the heat sealable layer are LDPE, ethylene/alpha-olefin copolymers, for example LLDPE, ionomers, ethylene/vinylacetate copolymers and mixtures thereof. The gas barrier layer typically comprises oxygen barrier resins, such as PVDC, EVOH, polyamides and mixtures of EVOH and polyamides. Typically, the thickness of the gas barrier layer is set for providing the film with an oxygen transmission rate at 23° C. and a relative humidity of 0%, less than 100 $cm^3/m^2.d.atm$, preferably less than 50 $cm^3/m^2.d.atm$, when measured according to the standard ASTM D-3985. Routine polymers for the heat resistant external layer are, for example, ethylene omo- or co-polymers, ethylene/cyclic olefin copolymers, such as ethylene/norborene copolymers, propylene omo- or co-polymers, ionomers, polyesters, polyamides. The film can further comprise other layers such as adhesive layers, bulk layers and similar for providing the thickness necessary to the film and for improving the mechanical properties thereof, such as the puncture resistance, the abuse resistance, the formability and similar. The film is obtained by any suitable co-extrusion process, by means of an extrusion head with a flat or circular opening, preferably by a co-extrusion or a heat-blowing process. The film to be used in a "skin-pack" or "VSP" packaging process, known also as vacuum process, is substantially non-oriented. Typically, the film, or one or more of the layers thereof, is cross-linked for improving, for example, the film strength and/or heat resistance when this film is brought in contact with the heating plate during the skin-pack vacuum packaging process. The cross-linking can be obtained by using chemical additives or subjecting the film layers to an energy radiation treatment, such as a high energy electron beam treatment, for promoting the cross-linking among the molecules of the irradiated material. Films adapted for this application have a thickness in the range from 50 to 200 micrometers, from 70 to 150 micrometers. Films adapted to be used as a film in a vacuum skin-pack packaging process are for example commercially available from Cryovac® with the trademarks TS201®, TH300®, VST™0250, VST™0280.

The film used as a lid or layer for closing a package (tray lidding), possibly for controlled-atmosphere packages are obtained by a coextrusion or a laminating process, for example. Such films can have symmetric or asymmetric structure, and can be mono-layer or multi-layer: the multi-layer films have at least two, more frequently at least five, still more frequently at least seven layers.

The overall thickness of the film can range from 3 to 100 microns, particularly from 5 to 50 microns, still more often from 10 to 30 microns. The films used as a lid can be cross-linked and can be more or less heat-shrinkable according to the needs. In some cases, the films comprise at least one heat-sealable tight layer and an external layer. Typically, the tight layer comprises a heat-sealable polyolefin in turn comprising just one polyolefin or a mixture of two or more polyolefins, such as polyethylene or polypropylene or a mixture thereof. Moreover, the tight layer can be provided with anti-fogging agents. The external layer can comprise polyesters, polyamides, or polyolefins. In some structures, the external layer can consist of a mixture of polyamide and polyester. In some cases, a barrier layer is provided. Generally, the barrier layer consists of thermoplastic resin selected among a saponified or hydrolyzed ethylenevinylacetate product (EVOH), an amorphous polyamide, and vinyl-vinylidene chloride and mixtures thereof.

The Actuators

The herein attached description and claims mention several actuators (a first, second, third, a further actuator, the main actuator/s etcetera). Each actuator can comprise a pneumatic, hydraulic, electric type actuator or of another kind. The term "actuator" comprises also mechanical or electromechanical actuators, for example worms commanded by electric motors, or springs of many types capable of exerting a thrusting or pulling action along a predetermined direction, or springs which are activated in a controlled way by mechanical or electromechanical elements. The actuators can be for example, in a non-limiting way, of a linear type and can be used for controlling the movement of parts on which such actuators act. The herein described and claimed actuators are preferably, but in a non-limiting way, controlled by the control unit of the packaging apparatus so that the several process steps will be suitably synchronized as described in the following.

DETAILED DESCRIPTION

Packaging Apparatus 1 generally indicates an apparatus for packaging a product P disposed on a support 4, for example on a flat support or on a tray provided with a lateral wall. The apparatus 1 is for example configured for vacuum packaging the product, by which a plastic material film is disposed on the product and intimately adheres at least to an upper edge of the support, to the upper or internal surface of the support which is not occupied by the product and also to the surface of the product in order to have a minimal amount of residual air inside the package. The apparatus 1 can also be used for forming a controlled atmosphere inside a package wherein air was previously removed.

The apparatus 1 comprises a frame 2, a conveyor 3 supported by the frame 2 and configured for moving the support 4 along a predetermined operative path from a station (not illustrated) for loading preformed supports or from a station (also not illustrated) for forming supports, towards a packaging station 5.

For example, the conveyor 3 can comprise a normally horizontal sliding plane, and a conveyor associated to the sliding plane for moving the supports 4 along the predetermined advancement path, particularly along the horizontal direction indicated by arrow A shown in FIG. 1. The conveyor 3 is configured for moving a predetermined number of supports 4 at a time along the advancement path in order to position them inside a packaging station 5 wherein the supports 4 are coupled to respective portions or sheets of film as will be described in the following. For example, a control unit 100 can control the conveyor 3 for moving a predetermined number of supports 4 from a region outside the packaging station 5 to a region inside the packaging station 5 wherein the supports are vertically aligned with reference to respective film portions or sheets.

For example, the conveyor 3 can comprise a first transferring device 3a (the conveyor belt shown in the figures, for example) configured for carrying the supports 4 in proximity of the packaging station and a second transferring device 3b (only schematically represented in the attached figures) adapted to withdraw one or more of said supports 4 and take them to the packaging station 5. The second transferring device 3b can include, for example, arms or other devices active on the supports 4 and capable of gathering a predetermined number of such supports 4 from the first transferring device 3a, taking them to the packaging station 5 and capable of returning towards the first transferring 3a and withdrawing a subsequent group of supports 4.

Alternatively, the conveyor 3 can include thrusting members (for example bars extending transversally to said direction A) active on the supports 4 and capable of sequentially thrusting predetermined series of supports inside the packaging station 5. For example, the thrusting members can be driven by chains or belts and can be moved to the interior of the packaging station 5 for correctly positioning a predetermined number of supports, and then can be retracted from the packaging station once the supports have reached the correct position inside the packaging station itself.

According to a further alternative, the conveyor 3 can include housings (for example plates provided with shaped cavities for receiving a predetermined number of supports) which are moved along said direction A1 and which move inside the packaging station 5 with the supports: according to this latter alternative, the housings are suitably shaped for being received inside the packaging station when the film is applied to the support.

According to an aspect, the conveyor 3 can further comprise at least one driving member 6, for example a stepper motor group or a system of actuators, for actuating the conveyor 3 and imparting to the supports 4 a step-by-step movement, so that the supports are periodically transported inside the packaging station 5 in synchronization with the operative conditions of this latter.

It should be observed that the products P can be placed on or in the support 4 both by hand and by a suitable device for loading the products. Positioning a product on or in the respective support 4 can be done upstream the trays loading station, at the trays loading station, or in any position between the trays loading station and the packaging station 5; otherwise, if the support is formed in-line, the product P is positioned on the support downstream the forming station, in any position between the forming station and packaging station 5.

The apparatus 1 comprises also a station 7 for supplying at least one plastic film 8 to be applied to the supports 4; specifically, the supplying station 7 can be supported by the frame 2 and comprises a drum on which is placed a reel of the continuous plastic film 8 which is guided towards the packaging station 5 by sequentially passing through a tension regulating unit 9 and a longitudinally cutting unit 10 active on said continuous film and adapted to cut the continuous film 8 in a plurality of film longitudinal strips 11. The tension adjusting unit 9 comprises, for example, a predetermined number of rolls and at least one dancer roll active on the continuous film, before being separated in strips, for maintaining the tension on the continuous film itself inside a predetermined range before the step of longitudinally cutting the film and separating it in a plurality of strips.

Downstream the longitudinally cutting unit 10 (with reference to a film or film strips advancement direction B) it is provided a movement system which is configured for sequentially moving the film strips towards the packaging station 5 and a transversally cutting unit 12 responsible for acting on the strips and cutting the strips transversally to the prevalent development direction thereof in order to form discrete sheets 15. The strips movement system comprises at least one positioning element 13, movable towards and away from the packaging station 5 and configured for grippingly acting on the film strips and moving said film strips towards the packaging station, and at least one stop element 14 associated to the packaging station and configured for grippingly receiving the film strips moved by the positioning element.

Figure 3:
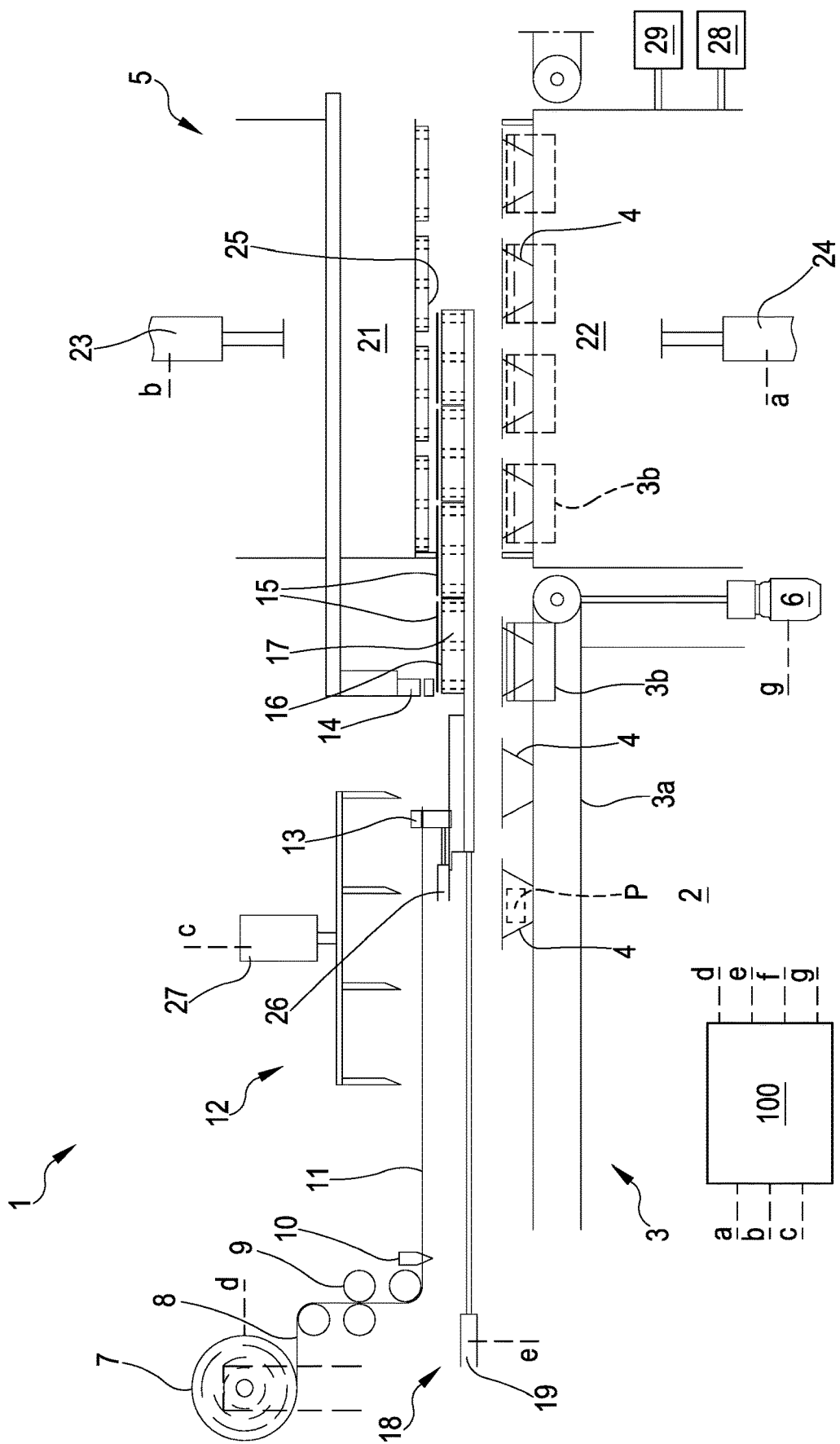
Figure 4:
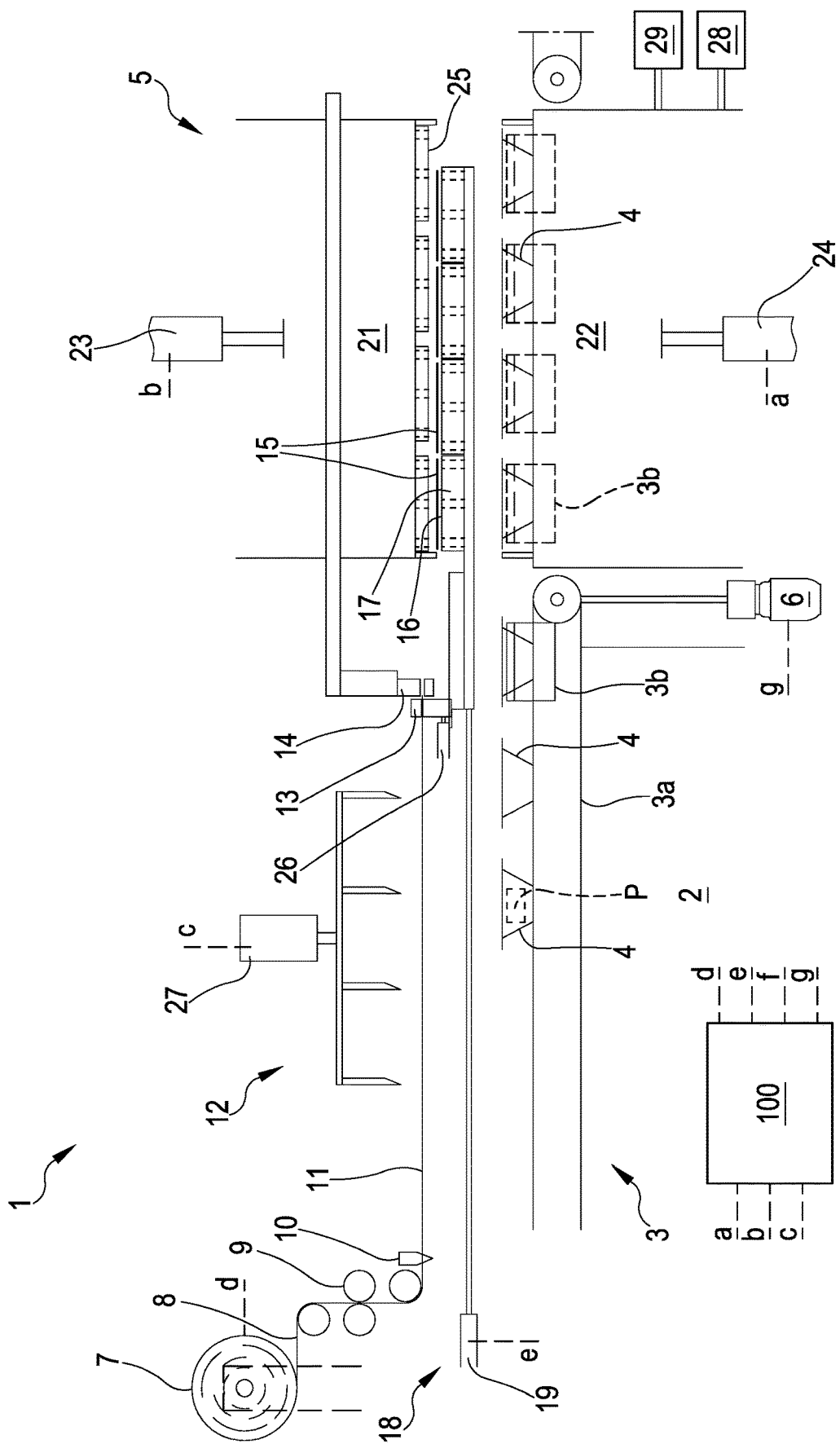

The movement system substantially provides to grippingly act on a free edge of each strip by the positioning element 13 which, for example by moving in the direction of the packaging station, carries the end of each strip to the stop element 14. In this way, as shown in FIGS. 3 and 4, a portion of the longitudinal strips 12 will be precisely placed at the area wherein the transversally cutting unit 12 operates, for example precisely below the blades of this latter.

As hereinbefore discussed, the transversally cutting unit 12 is configured for receiving the film strips and transversally cutting such film strips 11 in order to form a plurality of film discrete sheets 15, which will be deposited on the upper surface 16 of an abutment structure 17. Preferably, the sheets 15 exhibit the same geometry and size as the supports: more precisely, when the supports are flat, each sheet is shaped and sized in order to follow the perimeter of the flat support (at the maximum, the sheet can have a size slightly smaller or slightly greater than the perimeter of the flat support); in case of tray-shaped supports having a lateral wall and a top flange, each sheet is shaped and sized in order to follow the external perimeter of the top flange (at the maximum, the sheet can have a size slightly smaller or slight greater than the external perimeter of said flange). The abutment structure 17 is part of a device 18 for transferring the discrete sheets 15 and is movable back and forth along a predetermined operative stroke, as it is visible in Figures from 1 to 10. The abutment structure 17 is configured for receiving the discrete sheets 15 and moving them from a position outside the packaging station 5 to a position inside the packaging station 5: devices for holding the sheets 15 are provided in order to enable the discrete sheets to correctly adhere to the upper surface 16. For example, the abutment structure can be provided with suctioning holes connected to a suctioning source (not illustrated).

Figure 5:
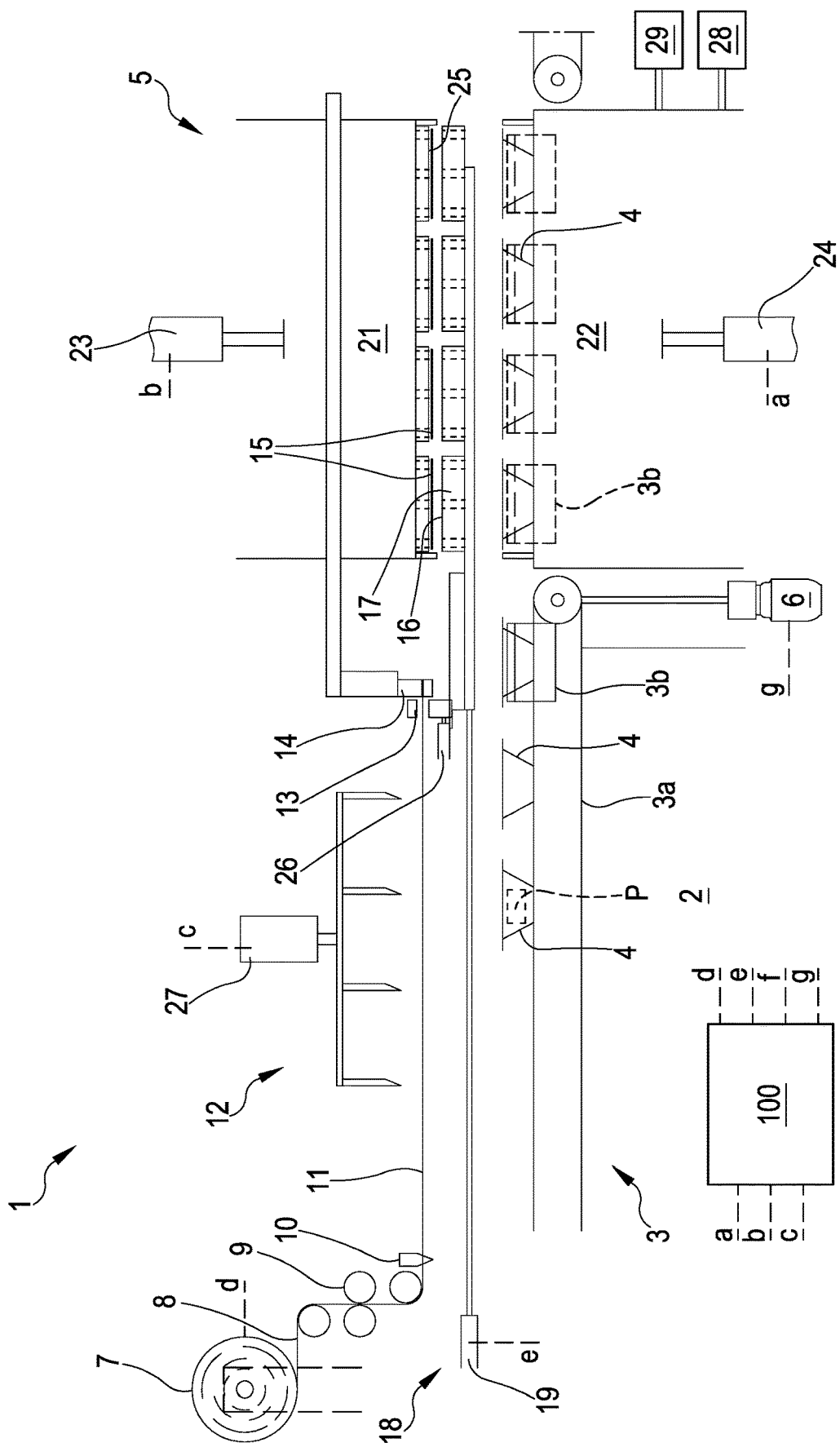
Figure 6:
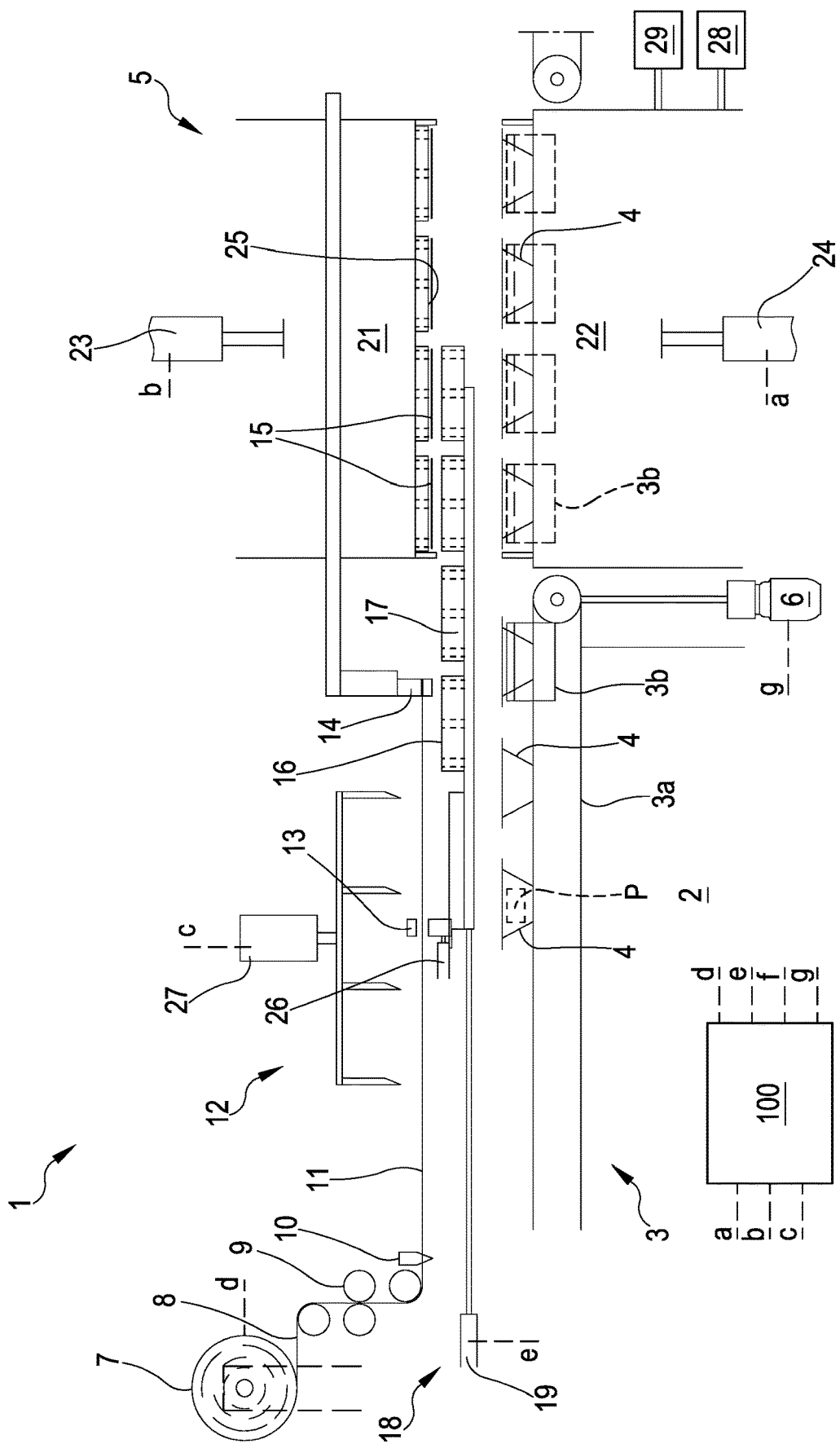
Figure 7:
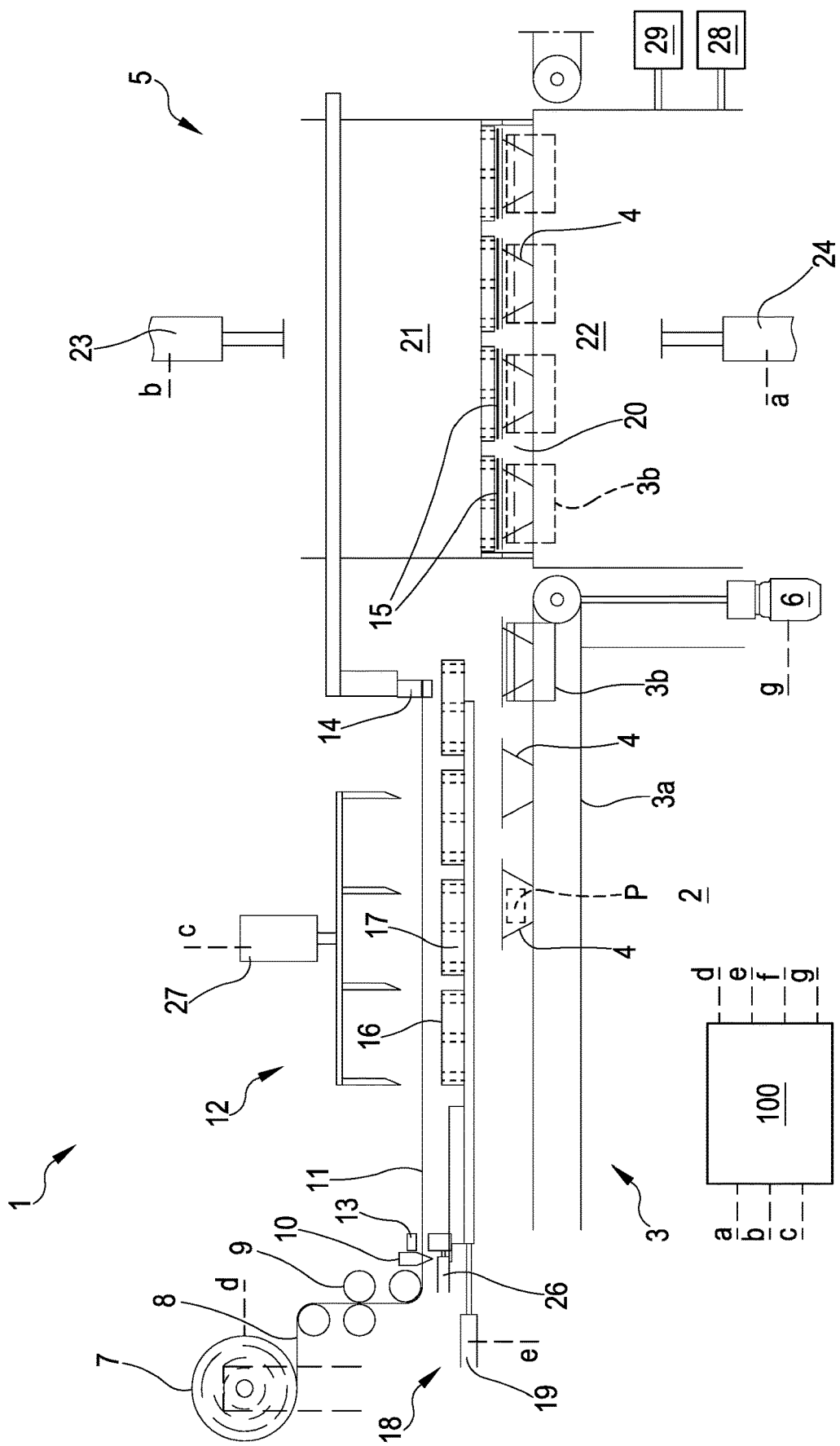

Alternatively, other holding devices such as mechanical retainers (pliers, for example), or adhesive elements, or something else can be provided for performing the described function. The transferring device 18 comprises at least one first actuator 19 configured for moving the discrete sheets abutment structure 17 between said position outside the packaging station and said position inside the packaging station. The packaging station comprises in turn a lower tool 22 defining a predetermined number of seats for receiving said one or more supports 4 receiving respective products P to be packaged, and an upper tool 21 configured for coupling said plastic film sheet to said one or more supports for making one or more packages. As it is visible in the attached figures, the packaging station 5 is configured for operating in at least one first operative condition (shown in Figures from 1 to 6, for example), wherein the upper and lower tools 21, 22 are distanced from each other, and in a second operative condition (FIGS. 7 and 8), wherein the tools 21 and 22 are approached each other in order to form at least one closed packaging chamber 20, particularly the chamber is fluid-tightly closed (the term "fluid-tightly closed chamber" means a closed chamber or communicating with fluid channels controlled by the apparatus 1); particularly, the packaging chamber can be formed around all the trays present in the station 5 or can be defined a respective packaging chamber for each tray. In order to move the upper tool and/or lower tool as hereinbefore described, the apparatus can comprise a main actuator 23 active for example on the upper tool 21 for raising and lowering the tool 21 itself with respect to the frame 2, or a main actuator 24 active on the lower tool 22 for raising and lowering the lower tool; alternatively, the apparatus 1 can comprise a respective main actuator 23, 24 interposed between the frame 2 and each of the upper and lower tools. In the illustrated example, the abutment structure 17 is in the shape of a plate, so that can easily enter the interior of the packaging station when this latter is in said first condition; the upper surface 16 is for example flat or slightly convex in order to receive the film sheets without forming substantial warps or folds on the same. Moreover, it is observed that in an optional shape (shown in the attached figures) the abutment structure is formed by a plurality of plates which can be arranged in a gathered configuration for defining an upper continuous surface 16 capable of receiving the sheets 15 and supporting the transversal cutting action (see Figures from 1 to 4, 9 and 10, for example) and in a distributed configuration wherein each plate is longitudinally and/or transversally distanced from the adjacent plates when, the sheets are withdrawn by means of the upper tool 21 inside the station 5 (see FIGS. 5 and 6). The gathered configuration switches to the distributed one by means of mechanical systems or by the action of suitable actuators controlled by the control unit 100.

When the abutment structure 17 is inside the packaging station 5, is predisposed to be placed in front of the upper tool 21 which is configured for receiving said film discrete sheets 15 from the abutment structure: for this matter, at an active surface 25 thereof facing the lower tool, the upper tool is provided with devices for holding the sheets 15. For example, the upper tool can exhibit an active surface 25 provided with suctioning holes connected to a suction source (not illustrated). Alternatively, other holding devices such as mechanical retainers (pliers, for example), or adhesive elements, or something else could be provided for performing the described function.

More particularly, it is observed that the positioning element 13 can comprise a single element or a respective positioning element for each film strip: if plural positioning elements 13 are provided, each positioning element is configured for grippingly acting on a respective film strip and for moving a free edge of the strip itself from a position away from the packaging station to a position approached the packaging station. In turn, the stop element 14 can comprise a single element or a respective stop element 14 configured for grippingly acting on each film strip: the stop element or each stop element is configured for receiving and therefore grippingly acting on the free edge of each strip when the positioning element is approached the packaging station so that a longitudinal tract of each film strip extends at the transversally cutting unit in this way can act as hereinbefore described. For enabling to exchange the engagement with the free edge between the positioning element and the gripping element, the positioning element is for example predisposed to engage the free edge of each strip in a position slightly retracted from the longitudinal end of each strip in order to leave at least a gripping edge on which the stop element can act. According to an aspect, the stop element 14 is supported by the packaging station 5, optionally by the upper tool, or by a stationary structure with respect to the frame 2 and adjacent the station 5, in this way—when the positioning element is approached the packaging station—such positioning element is immediately adjacent the stop element and is capable of releasing this said latter free edge of each strip.

As it is visible in the attached figures, the positioning element 13 is supported by the abutment structure 17 of the transferring device 18 and a second actuator 26 is active on the positioning element 13 and is configured for moving the positioning element 13 itself with respect to the abutment structure 17 according to a reciprocal motion suitably coordinated by the motion imparted by the first structure 19 to the abutment structure itself, as specifically described in the following.

The transversally cutting unit 12 comprises at least one third actuator 27 configured for moving one or more blades of the transversally cutting unit between a rest position, wherein the one or more blades do not interfere with the film strips, and an active position, wherein the one ore more blades are predisposed to transversally cut the film strips in order to form the plurality of film discrete sheets 15. The motion of the blades of the cutting unit, imparted by the third actuator 27, is suitably coordinated with the movements imparted to the abutment structure 17 and positioning element 13, and also with the motion imparted to the trays by the conveyor 3 and to the packaging station of the actuator 23 or by the actuators 23 and 24.

Figure 2:
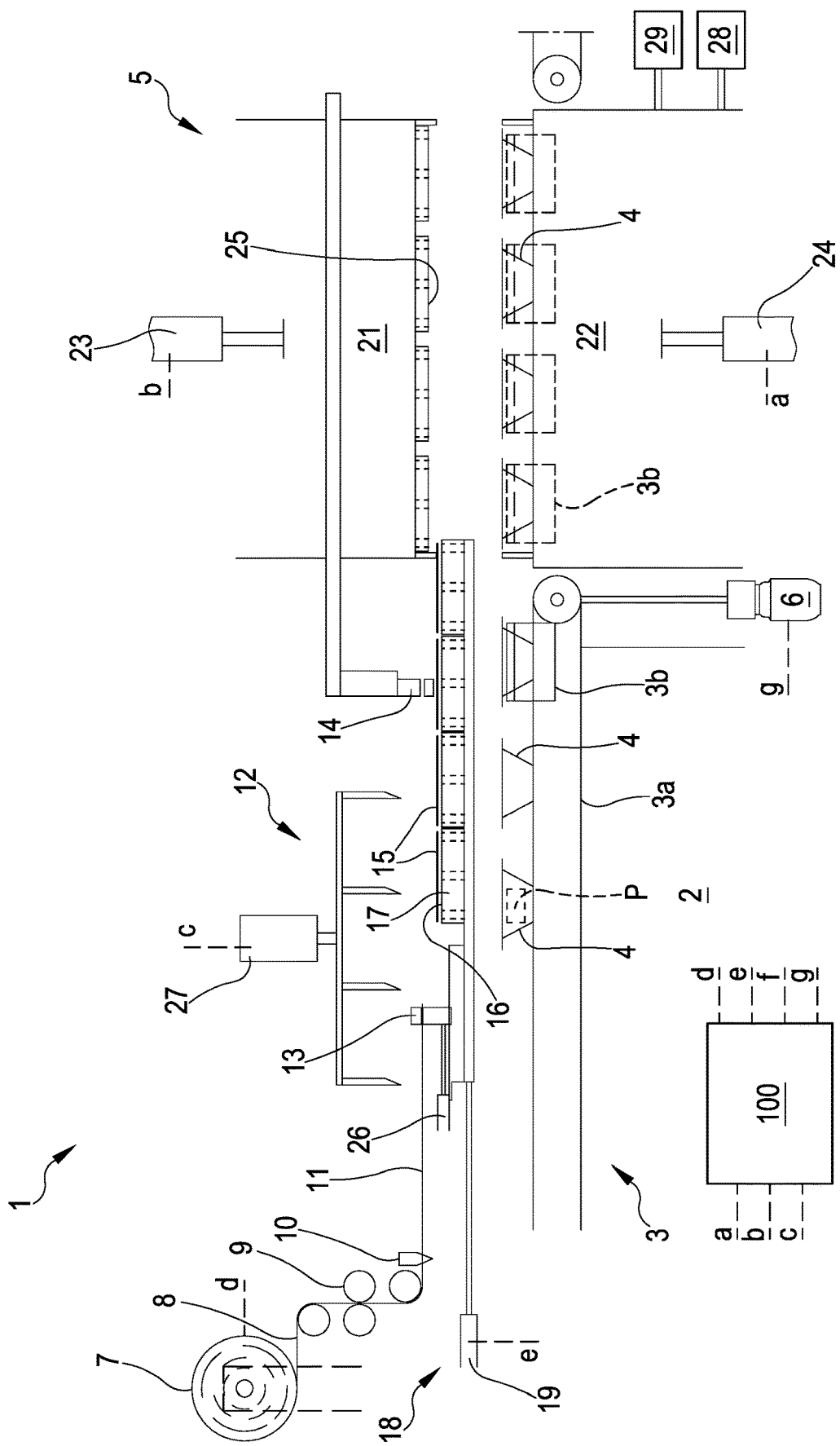

To this end, the control unit 100 is connected with the first, second and third actuators 19, 26 and 27 and is configured for cyclically executing a control process comprising the following steps:

commanding the packaging station, for example by commanding at least one of the main actuators 23, 24, in order to position the station in the first operative condition, commanding the first actuator 19 to move the abutment structure 17 along a first direction from the external position to the position inside the packaging station (FIG. 2), commanding the second actuator 26 to impart to the positioning element 13 a relative motion with respect to the abutment structure along a second direction opposite to the first direction (FIG. 2); it is observed that the relative motion imparted to the positioning element along the second direction and the motion imparted to the abutment structure along the first direction, generally cause the positioning element 13 to approach the stop element 14, as it is visible in FIG. 3 and FIG. 4.

Figure 8:
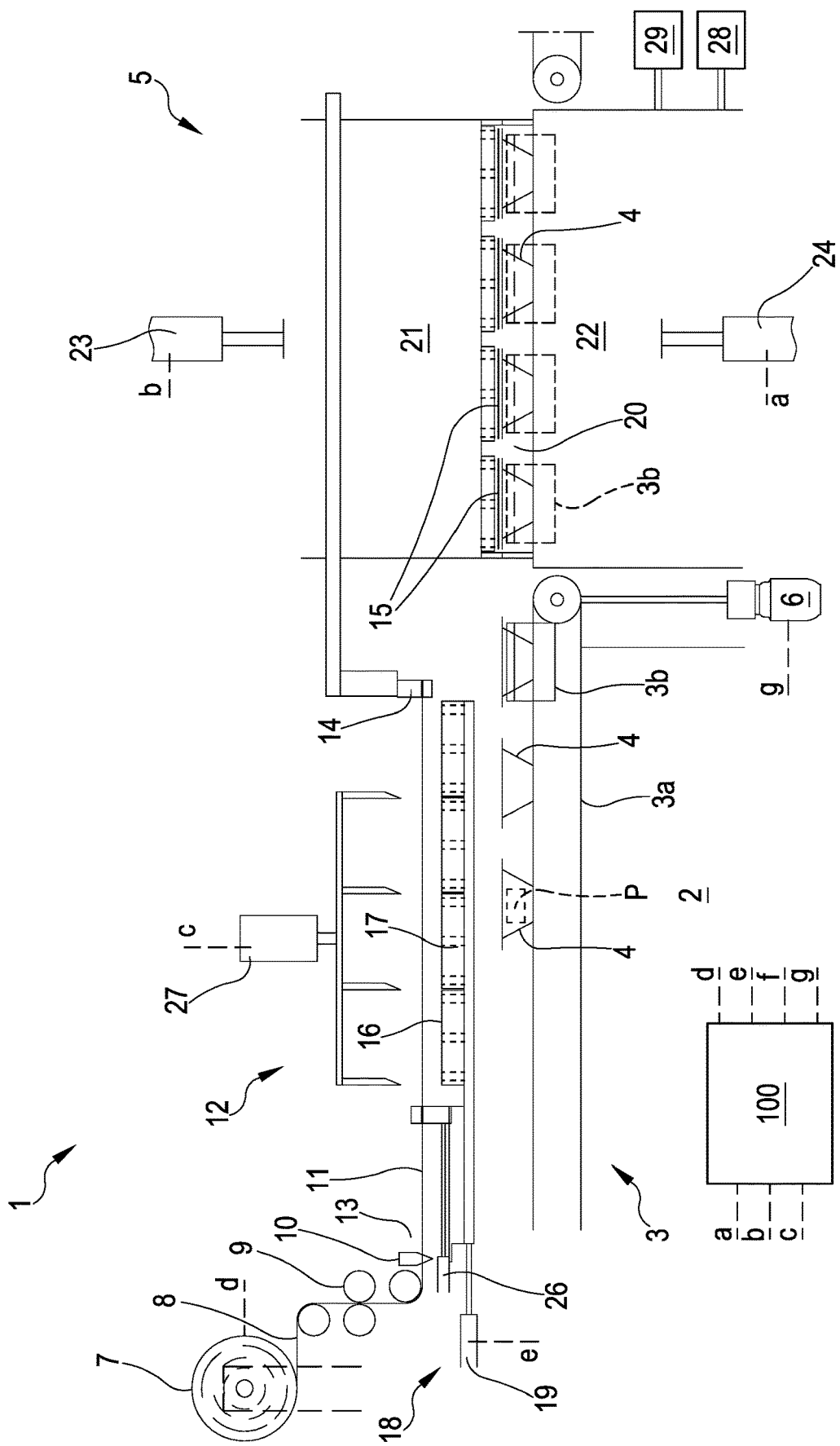
Figure 9:
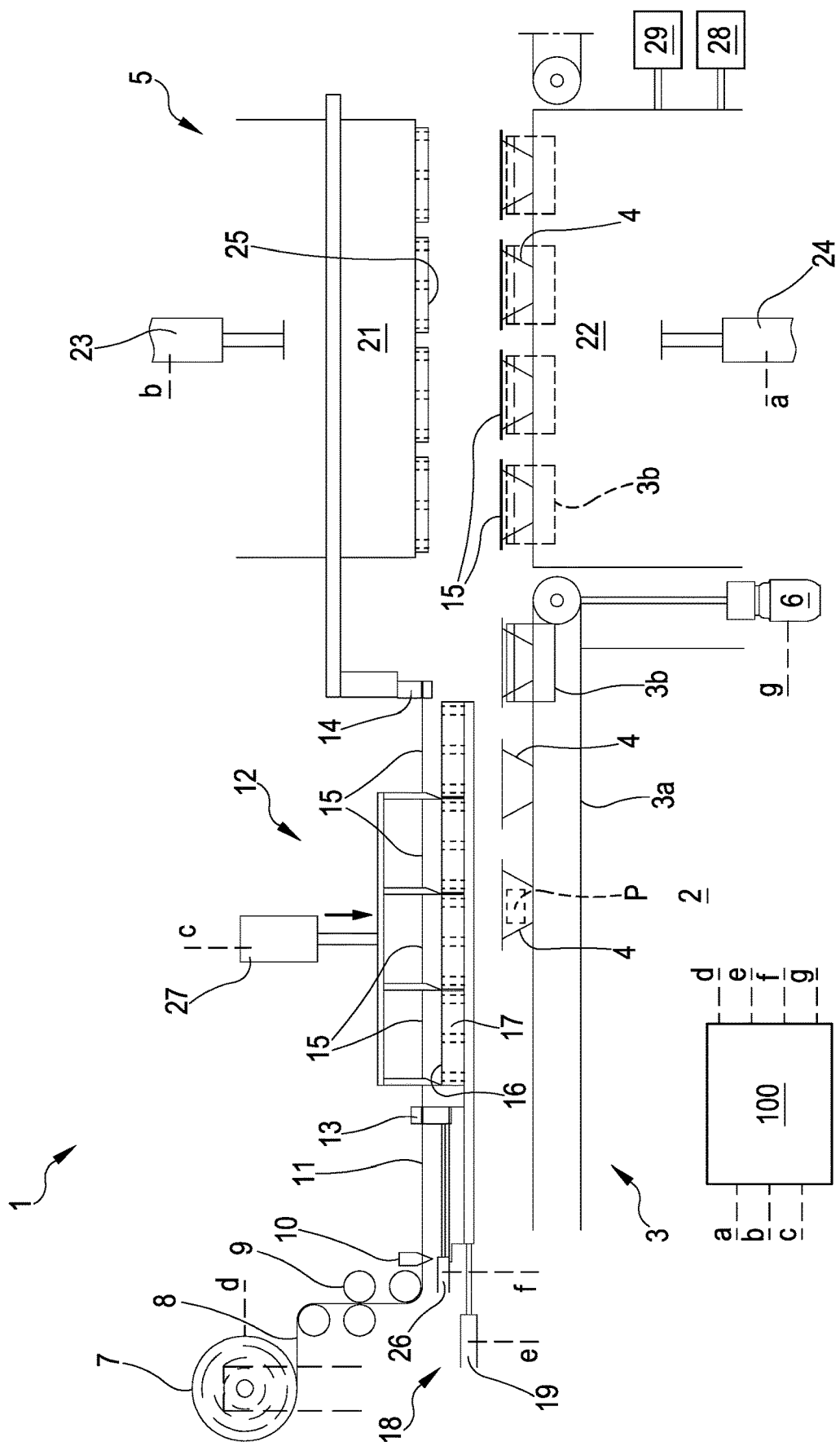
Figure 10:
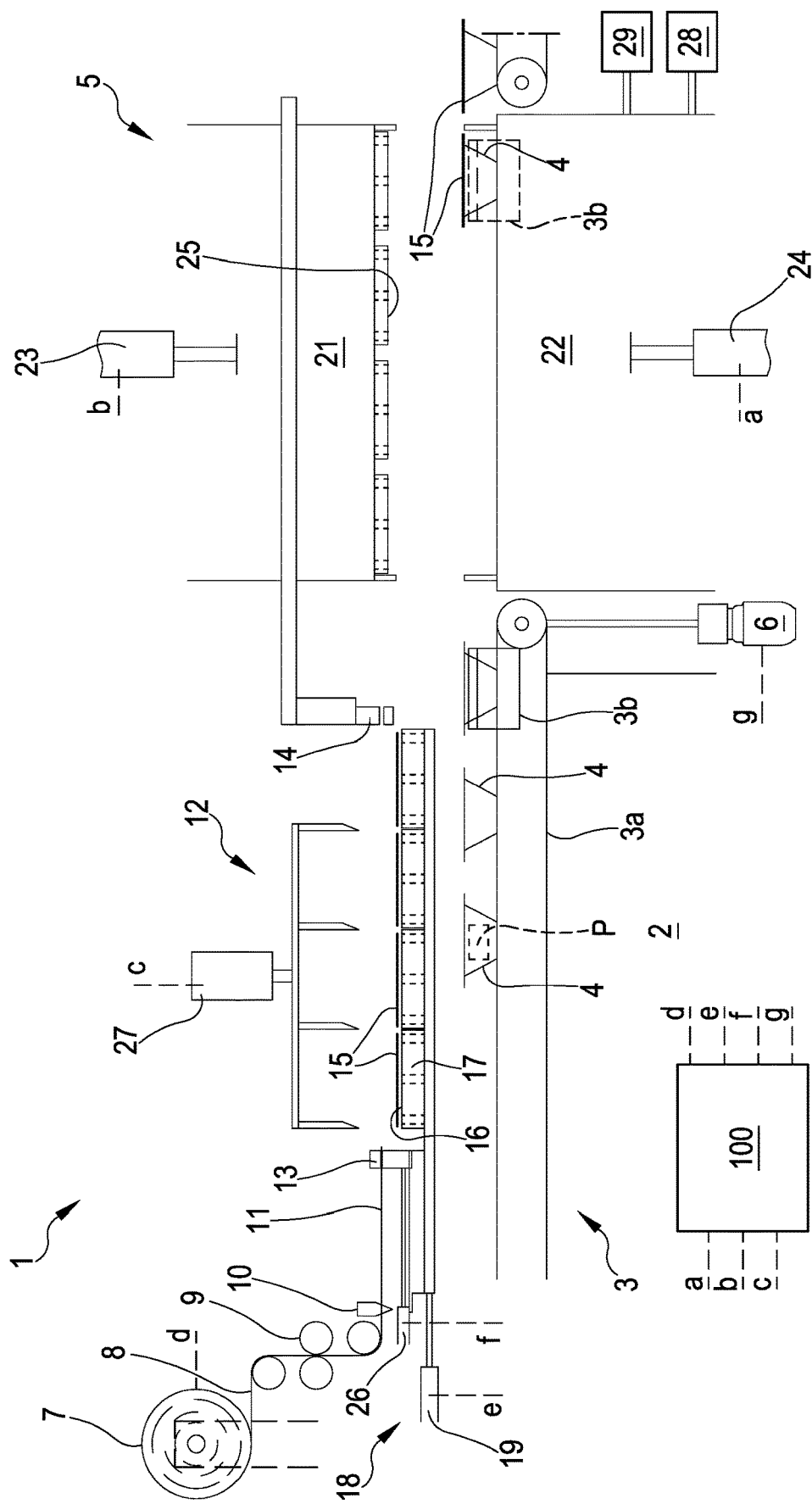

Once the abutment structure 17 reaches the position inside the packaging station 5 and the positioning element is approached the stop element, the control unit is also configured to perform the following further process control steps:

the stop element 14 is commanded to grippingly act on the film strips so that the film strips moved towards the stop element 14, are longitudinally stopped by this latter, therefore, the positioning element 13 is commanded to release the film strips so that the positioning element does not interfere with the film strips, the upper tool is commanded to withdraw the discrete sheets (obtained by a previous cycle of the control process) from the abutment structure, while the stop element is gripping said film strips and stop element is releasing the film strips themselves, the first actuator 19 is again commanded to move the abutment structure and positioning element along a third direction opposite to the first direction in order to withdraw the abutment structure to a position outside the packaging station, the second actuator 26 is commanded to impart to the positioning element a relative motion with respect to the abutment structure along a fourth direction opposite to said third direction in order to place the positioning element adjacent said abutment structure so that a longitudinal tract of said film strips extending between each positioning element and each stop element, is disposed at—preferably above—said abutment structure and at—preferably below—the blades of the transversally cutting unit (FIG. 8 shows this case wherein the tract of each film strip extends between the positioning element and the stop element exactly placed between the blades of the transversally cutting unit and upper surface of the abutment structure), the third actuator is commanded to move the one or more blades of the transversally cutting unit to an active position and to transversally cut the film strips in order to form the plurality of film discrete sheets positioned above the abutment structure. During the transversally cutting step, the control unit 100 provides to hold the film strips gripped by both the/each positioning element 13 and the/each stop element 14.

When the sheets 15 are positioned inside the packaging station 5 and the abutment structure 17 returns to the position outside the station 5 itself, the control unit can command one ore both the main actuators 23, 24 and can command to close the packaging station which is taken to the second condition wherein the film sheets are fixed to respective supports.

In addition, the apparatus 1 can comprise an air suctioning system 28 comprising, for example, one or more air suctioning channels connectable to the packaging chamber and to at least one gas suctioning pump, and to a controlled atmosphere generating system for example comprising one or more gas injecting channels connectable to the packaging chamber and to a gas or gas mixtures source. Moreover, the control unit can be configured for commanding the air suctioning system 28 to generate a negative pressure or an approximate vacuum inside the packaging chamber 20 and/or for commanding the controlled atmosphere generating system to inject inside the packaging chamber a mixture of gases having a predetermined composition.

Lastly, optionally, at least one penetrating tool (not illustrated) associated to the packaging station 5 and adapted to operate inside the packaging chamber is provided; the penetrating tool can be configured for moving between a rest position, wherein is distanced from supports present in the lower tool, and an active position, wherein is capable of drilling a wall of said support positioned in the lower tool, for forming one or more holes. The suctioning system and/or controlled atmosphere generating system 28, 29 can be connected to the packaging chamber also or only through a channel present in the penetrating tool so that a gas can be extracted or injected into the packaging chamber through the channel of the penetrating tool. In this case, the control unit is connected to the packaging station and to an auxiliary actuator active on the penetrating tool and configured for commanding to position the penetrating tool in an operative position, for commanding the packaging station to tightly constrain each film sheet to the respective support, for commanding the suctioning system or controlled atmosphere generating system to remove the air from the packaging chamber or be inject a gas into the packaging chamber, respectively, also through the channel of the penetrating tool. For example, optionally the control unit can command to remove a gas through the channel present in the penetrating tool also upon tightly constraining the supporting sheets.

Once new discrete sheets 15 have been obtained on the upper surface 16 of the supporting structure 17 on one side, and the packaging station 5 has fixed the discrete sheets 15 present in the chamber 20 to respective supports by possibly applying a vacuum or the controlled atmosphere, on the other side, the packaging station 5 can be commanded by the control unit 100 to return to the first operative condition, the product packages can be extracted from the packaging chamber and the above described cycle can be repeated. In other words, during the new cycle, the above described steps will be repeated, the abutment structure 17 takes new film discrete sheets 15 to the interior of the packaging station 5, the conveyor 3 transports new supports 4 to the interior of the packaging station 5 itself; then the supporting structure returns to the outside of the packaging station 5 which will make new packages, while a new series of film strips 11 is positioned on the abutment structure, to be cut by means of the blades of the transversally cutting unit.

According to the invention, the apparatus 1 comprises a compensating device 30 configured for exerting a tensioning action on one or more portions of said film strips 11 extending between said longitudinally cutting unit and said positioning element.

In a first variant (see FIG. 11), the compensating device is configured for acting on said positioning element 13, in order to regulate the force such positioning element exerts on each film strip, so that when the positioning element 13 moves away from the longitudinally cutting unit 10, a tensioning action on the portions of longitudinal film strips upstream the/each positioning element 13 is generated, in order to take any possible material buildup downstream the positioning element. Substantially, after one or more packaging cycles, and due to the lack of a geometrical precision of the plastic continuous film 8, the strips will exhibit several lengths and there will be the tendency of depositing a surplus of material at one or more strips (this material surplus could cause the formation of undesired loops in the strips 11), the motion of the/each positioning element due to the action of the compensating device causes the strips to be pulled and stretched at least in the tract of such strips, extending upstream the positioning element.

In a second variant (see FIG. 13 and FIG. 14), the compensating device 30 is active on the stop element and particularly on each stop element in order to exert a pulling action on the end of each longitudinal strip and therefore a pulling action on the longitudinal strips along the overall extension thereof.

In a third variant (illustrated in FIG. 12), the compensating device is active on each longitudinal tract of said film strips, extending between said positioning element and said stop element: substantially, the compensating device 30 acts, in this case by directly thrusting the surface (for example the upper surface) of the strip tract under consideration for pulling, downstream the positioning element, any possible film buildup which is forming between the longitudinally cutting unit and positioning element.

It is observed that the apparatus can comprise a combination of two or can also comprise all the three above described variants of the compensating device 30.

According to an aspect of the invention, the positioning element 13 (or each positioning element when a respective positioning element is provided for each longitudinal strip 11) comprises at least one first and one second gripping portions. For example, each positioning element can implement a pliers. The first and second gripping portions are movable from each other between a gripping condition wherein the first and second gripping portions are approached each other and are configured for grippingly acting on a portion of said film strips, and a releasing condition, wherein the first and second gripping portions are distanced from each other for enabling the positioning element to freely slide with respect to the film strips. The compensating device 30, according to the first variant shown in FIG. 11, comprises a commanding member 31 (for example a hydraulic, pneumatic or electric actuator, or a spring or another mechanical system activable by means of a suitable command system) active on the positioning element and configured for positioning the first and second gripping portions, not only in said gripping condition and releasing condition, but also in a condition intermediate between said gripping condition and said releasing condition. In the intermediate condition, the first and second gripping portions are sufficiently close to each other but do not block the respective film strip, so that the first and second portions contact the film strips in order to enable the gripping element to forcedly slide on the film strips themselves. In other words, when the positioning element exhibits the gripping portions in an intermediate position, such portions determine an interference passage of the film strips so that a relative movement of the or of each positioning element 13 away from the longitudinally cutting unit 10 causes the strip portions upstream the or each positioning element 13 to be tensioned. According to a further aspect, the commanding member can be controlled by the control unit 100 in order to automatically control the relative position of the first and second portions and therefore to regulate the interference exerted on the strips during the motion of the tensioning element and therefore in order to control the amount of said tensioning action.

Optionally, the control unit 100 is also configured for commanding the commanding member 31 and for moving the first and second gripping portions of the positioning element to said intermediate condition and, by maintaining in said intermediate condition the first and second portions of the positioning element, for commanding the second actuator to impart to the positioning element the relative motion (away from the longitudinally cutting unit) with respect to the abutment structure along the fourth direction in order to exert said tensioning action on a longitudinal portion of said film strips 11, which extends between the longitudinally cutting unit 10 and said/each positioning element 13 and therefore in order to stretch one or more film strips portions extending between said longitudinally cutting unit 10 and said/each positioning element 13 during the relative motion of the positioning element with respect to the abutment structure along said fourth direction. Once the control unit has completed the stroke along the fourth direction, the same is configured for commanding the commanding member to take the first and second gripping portions to a gripping condition on the film strips, so that a possible material buildup is transferred to the strips tract between the positioning element and stop element. Then, the control unit can command the transversally cutting unit to operate on the strips and form the discrete sheets 15.

In the second variant shown in FIGS. 13 and 14, a stop element 14 for each film strip 11 is provided: each stop element is configured for grippingly receiving the free edge of a respective strip when the positioning element is in a position approached the packaging station. The compensating device 30 in this case comprises a respective regulator 33 active on each of said stop elements 14 and configured for moving the respective stop element 14 away from the positioning element 13 for exerting a pulling action on each film strip 11.

Particularly, each regulator 33 can comprise a thrusting member 34 (a pneumatic or hydraulic or electric element or actuator, for example) thrustingly acting on each stop element 14 and a stroke limiter 35 (comprising two stops distanced from each other by few millimeters, for example) for defining a maximum range of each stop element due to the action of the thrusting member 34. Alternatively, it can be provided a regulator controlled by the control unit 100 between a non-operative condition wherein is not active on the respective stop element, and an operative condition wherein acts on the respective stop element: in this case, the control unit is configured for commanding said regulator to move to said operative condition at least before commanding the third actuator and transversally cutting the film strips in order to form the plurality of discrete film sheets, by simultaneously holding each positioning element in a condition releasing the film strips or at a maximum in said intermediate condition during the operation of the regulator.

In the third variant shown in FIG. 12, the compensating device 30 comprises at least one thrusting member 32 configured for acting at the longitudinal tract of at least one of said film strips, extending between said positioning element and said stop element; for example, the compensating device 30 comprises a respective thrusting member 32 configured for acting at the longitudinal tract of each of said film strips, extending between said positioning element and said stop element.

Each thrusting member 32 can comprise a simple pusher elastically thrusted by an abutment spring. Alternatively, each thrusting member 32 can comprise a thrusting member movable between a non-operative condition, wherein such thrusting member does not act on any film strip, and an operative condition, wherein the at least one thrusting member acts on the longitudinal tract of at least one of said strips, disposed between the positioning element and stop element. In this case, the control unit 100 is configured for commanding the thrusting member to said operative condition, at least before the step of transversally cutting the strips in order to form the discrete sheets, by holding at the same time each positioning element in a condition releasing the film strips or at a maximum in said intermediate condition: the above operations are performed for determining a thrust on each tract of said strips downstream the positioning element so that the strip tracts upstream the positioning element 13 itself are suitably tensioned so that a buildup of film, if present, is displaced downstream the positioning element, on one or more of the strips before each transversal cut.

It is also an object of the invention a method of packaging a product. Optionally, the packaging method can use an apparatus 1 of a type described hereinbefore or of a type according to one or more of the attached claims. As a non-limiting example, the packaging method described hereinbelow, is implemented by using the above described apparatus 1 and herein it is made reference to the attached figures.

The packaging method provides to move one or more supports 4 on which at least one respective product P is placed, along the predetermined advancement path A, until they reach or enter the interior of the packaging station 5. The supports 4 with the associated products P are moved by a step-by-step advancement since the packaging station, once loaded with a predetermined number of supports 4 and of respective sheets 15, must close the same by means of the sheets 15 and therefore requires a predetermined operative time in which the station itself is closed in the second operative condition in order to prevent new supports or a plastic film from gaining access.

While the supports advance towards the packaging station, the method provides to supply a continuous plastic material 8 towards the longitudinally cutting unit 10 which provides to longitudinally cut the continuous plastic film in order to form two or more film strips 11.

The film strips 11 formed in this way, are moved towards the packaging station 5 by a coordinated operation of the/each positioning element 13 and of the/each stop element 14. The film strips, before entering the packaging station, are transformed into discrete sheets 15 by the action of the transversally cutting unit 12. The discrete sheets 15 are then conveyed inside the packaging station 5 by the abutment structure 17 and, once arrived inside the packaging station, they are applied to respective supports 4 for making one or more finished packages. Once the described cycle has ended, the packaging station is taken to the first condition, the finished packages are removed, and a new packaging cycle can start.

According to the invention, during the movement of the strips 11 towards the transversally cutting unit, it is provided a compensating step comprising exerting a tensioning action on one or more portions of film strips disposed between the longitudinally cutting unit and packaging station. By the compensating step, any possible material buildup of the strips 11 which forms loops in the film strip portions disposed between the longitudinally cutting unit and positioning element, is taken—at each packaging cycle—downstream the positioning element itself and is then discarded by the transversally cutting operation. Particularly, the compensating step provides to exert a differentiated tensioning action on each portion of said strips 11, extending between the longitudinally cutting unit 10 and the positioning element/s 13, so that in case of a lack of a dimensional uniformity among the several strips 11, it is immediately performed a step of compensating the tension in order to avoid to form material buildups upstream the positioning element/s 13 from the beginning.

Still more particularly, the step of moving the film strips comprises engaging a free edge of each said strips by means of the positioning element (if several positioning elements are provided, this step causes each element to grippingly act on the respective strip) and moving the free edge of said film strips towards the packaging station; then, the free edge of said strips is received by a stop element, associated to the packaging station: a respective stop element is provided for each strip, for example.

As already illustrated, the compensating step can be performed by a tensioning action on each said strips which in turn is performed by acting on the positioning element/s or on the stop element/s, or by exerting a thrust against a longitudinal tract of said film strips extending between the positioning element/s and stop element/s.

After the compensating step, the method provides, as already discussed, to transversally cut such the film strips at a transversally cutting unit 12 in order to form a plurality of film discrete sheets 15, and to dispose the film discrete sheets on an upper surface 16 of the abutment structure 17 of the transferring device 18; the abutment structure 17 is then moved for taking the discrete sheets present on said upper surface to the interior of the packaging station, wherein the discrete sheets are withdrawn by means of the upper tool 21.

More particularly, the method provides to move the abutment structure 17 of the discrete sheets 15 along a first direction from the external position to the position inside the packaging station 5 (during this step the packaging station is in the first operative condition); simultaneously with the movement of the abutment structure 17 along the first direction and grippingly maintaining the positioning element on said film strips, the method provides to impart to the/each positioning element a relative motion with respect to the abutment structure along a second direction opposite to the first direction in order to cause an advancement of the film strips 11 towards the packaging station: the relative motion imparted to the/each positioning element along the second direction and the motion imparted to the abutment structure along the first direction, generally determine an overall stroke of the/each positioning element less than the stroke of the abutment structure so that, as shown in FIGS. from 2 to 5, the/each positioning element approaches the/each respective stop element. Once the abutment structure 17 has reached the position inside the packaging station 5 and the/each positioning element 13 is near the/each respective stop element 14, the method provides to perform the following further operations: withdrawing the film strips by means of the/each stop element 14, and releasing the film strips by means of the/each positioning element 13: in this way, each strip 11 is held by the stop element/s, while the/each positioning element can freely move; while, the upper tool provides to withdraw the beforehand formed discrete sheets from the abutment structure, which at this time can return outside the packaging station. Then, while the stop element/s is/are gripping said film strips and the positioning element/s has/have released the film strips themselves, the method provides to move the abutment structure and the positioning element/s 13 along a third direction opposite to the first direction, in order to take the abutment structure 17 to said position outside the packaging station, and simultaneously the positioning element/s 13 slides/slide on the strips 11 gripped by the stop element/s 14. Preferably, after the abutment structure has returned to a position outside the packaging station, the method provides to impart to the/each positioning element 13 a relative motion with respect to the abutment structure 17 along a fourth direction opposite to said third direction until the/each positioning element is placed adjacent said abutment structure so that a longitudinal tract of said film strips extending between the positioning element/s and stop element/s 14 is disposed at—preferably above—said abutment structure 17. Now, the/each positioning element 13 is again grippingly taken on the film strips and, by grippingly holding such positioning element/s on said strips, the method provides to move one or more blades of the transversally cutting unit 12 to an active position and to transversally cut the film strips in order to form the plurality of film discrete sheets 15 positioned above the abutment structure. While the abutment structure is outside the packaging station, this latter is moved to the second operative condition in order to form a fluid-tight closed packaging chamber and the film discrete sheets 15 supported by the upper tool 21 are engaged with the respective supports 4. During this step, it is for example provided a heater (not illustrated because per se known) which heats the active surface 25 of the upper tool 2 and therefore the film sheets supported by the upper tool itself in order to enable, for example, to tightly join the film sheets to the underlying supports by heat-sealing. However, it is not excluded the possibility of joining the sheets to the supports by several methods for example by using suitable adhesives. Before and/or after the step of engaging the discrete sheets 15 with the respective supports 4, a step of evacuating gas from the packaging chamber 20 is performed for vacuum-packaging the products, for example. Alternatively, before completely tightly fixing the film sheets to the associated supports, there is the possibility of providing a step of forming a controlled atmosphere inside the packaging chamber 20.

Going into specific details of some aspects of the invention, it is outlined that the compensating step can comprise, in a first alternative, positioning the first and second gripping portions of the/each positioning element 13 in a condition intermediate between said gripping condition and said releasing condition; in the intermediate condition, the first and second gripping portions contact said film strips 11 in order to enable the respective gripping element 13 to forcedly slide on the film strips themselves; in this case, while holding the first and second gripping portions of the positioning element in the intermediate condition, the compensating step provides to perform the relative motion of the positioning element along said fourth direction opposite to said third direction so that during such relative motion along the fourth direction, the/each positioning element 13 exerts the tensioning action on the strips portion disposed between the longitudinally cutting unit 10 and the positioning element/s 13, in order to stretch the strip portions disposed between the longitudinally cutting unit and the positioning element/s.

In a second alternative (FIGS. 13 and 14), the compensating step comprises to regulate the longitudinal position of a stop element, preferably to regulate the longitudinal position of each respective stop element for each film strip; always grippingly holding the non-active positioning element on said strips during the compensating step, the regulation of the longitudinal position of each stop element (the displacement of each stop element away from the longitudinally cutting station, for example) enables to exert a tensioning action on the longitudinal portion of said film strips, which extends between the longitudinally cutting unit and said positioning element and therefore enables to stretch one or more portions of film strips, extending between said longitudinally cutting unit and said positioning element.

In a third alternative (FIG. 12), the compensating step comprises to actuate a thrusting member, preferably a respective thrusting member, so that it thrustingly acts against each longitudinal tract of said film strips, extending between said positioning element and said stop element. Preferably, each thrusting member 32 acts in a position immediately upstream the blades of the transversally cutting unit 12 and immediately downstream the position reached by the/each positioning element 13 at the end of the motion along the above described fourth direction. The thrusting member thrustingly acting on the respective longitudinal tract of said strips—by grippingly holding the non-active positioning element on said strips—enables to exert a tensioning action on the longitudinal portion of said film strips, which extends between the longitudinally cutting unit and said positioning element and therefore to stretch one or more film strips portions extending between said longitudinally cutting unit and said positioning element.

According to a further aspect, it is specified that the compensating step, according to the described variants, is performed before transversally cutting the film strips in order to form the plurality of film discrete sheets. Particularly, at the end of the compensating step, each positioning elements 13 are closed, therefore they grippingly act on the film strips which will be blocked between the positioning element/s and stop element/s 14. Therefore, the transversally cutting step is performed by the blades of the unit 12, consequently the discrete sheets 15 will be deposited on the surface 16 of the abutment structure 17.

The steps described in the illustrated packaging method are cyclically repeated at each cycle of forming finished packages.

As said, the invention finds an application both in vacuum packaging processes and in natural or controlled atmosphere packaging processes. Moreover, while the described embodiments provide to transversally cut the material strips outside the packaging station, the invention can also find an application when such transversal cut is performed inside the packaging station or downstream the same.

Lastly, with reference to the third variant in FIG. 3 wherein one or more pushers 32 active on the upper surface of said strip tracts are provided, as an alternative it is provided to use attraction systems active on the lower surfaces of the tracts themselves (for example suctioning systems).

The invention claimed is:

1. An apparatus for packaging a product, said apparatus comprising:
a frame,
a conveyor engaged to the frame and configured to move along a predetermined advancement path one or more supports of a type having at least one base wall,
a supplying station configured to supply at least one plastic film to be applied to said one or more supports;
a packaging station comprising:
a lower tool defining a predetermined number of seats to receive said one or more supports housing respective products to be packaged, and
an upper tool configured to couple portions of said plastic film to said one or more supports for making one or more packages, said packaging station being configured to operate at least in at least one first operative condition, wherein the lower tool and upper tool are distanced from each other, and in a second operative condition, wherein the lower tool and upper tool are approached each other in order to form a packaging chamber;
a longitudinally cutting unit configured to receive the plastic film from the supplying station as a continuous plastic film and to longitudinally cut the continuous plastic film to form two or more film strips,
at least one positioning element, movable towards and away from the packaging station and configured to grippingly act on the film strips and move said film strips towards the packaging station;
at least one stop element configured to grippingly receive the film strips moved by the positioning element,
a compensating device configured to exert a tensioning action on one or more portions of said film strips extending between said longitudinally cutting unit and said positioning element.

2. The apparatus of claim 1, wherein the compensating device is configured to act on at least one of:
said positioning element,
said stop element,
a longitudinal tract of at least one of said film strips extending between said positioning element and said stop element.

3. The apparatus of claim 1, wherein the compensating device comprises a respective compensating device for each film strip, and wherein each respective compensating device is configured to exert a differentiated tensioning action on each portion of said strips extending between the longitudinally cutting unit and the positioning element.

4. The apparatus of claim 1, further comprising:
a transversally cutting unit configured to receive said film strips and transversally cut the film strips to form a plurality of discrete sheets of film, the stop element being configured to grippingly act on each film strip when the positioning element is in a position approached the packaging station and being disposed so that a longitudinal tract of each film strip extends at the transversally cutting unit;

a transferring device for transferring the discrete sheets, comprising an abutment structure movable back and forth along a predetermined operative stroke and configured to receive said discrete sheet and move then from a position outside the packaging station to a position inside the packaging station; said upper tool being configured to receive said discrete sheet of film from the abutment structure positioned in said position inside the packaging station.

5. The apparatus of claim 4, wherein the lower tool defines at least one positioning seat configured to receive one or more supports, and wherein in said first operative condition, the lower tool and upper tool are spaced from each other in order to enable the discrete sheets of film to enter the packaging station of said abutment structure; and wherein in said second operative condition, the lower and upper tools are approached and define at least one fluid tightly closed packaging chamber,
wherein a rollers tension regulating unit is positioned between the supplying station and the longitudinally cutting unit and wherein the rollers of the regulating unit comprise at least one dancer roller and are active on said continuous film.

6. The apparatus of claim 1, wherein the at least one positioning element comprises a respective positioning element for each film strip, each positioning element being configured to grippingly act on a respective film strip and to move a free edge of the strip itself from a position away from the packaging station to a position approached the packaging station; and
wherein the compensating device comprises a respective compensating device active on each positioning element to exert said tensioning action in a differentiated way on each film strip.

7. The apparatus of claim 1, wherein the at least one stop element comprises a respective stop element configured to grippingly act on each film strip when the positioning element is in a position approached the packaging station; wherein the at least one stop element is supported by the packaging station so that—when the positioning element is in a position approached the packaging station—the positioning element is immediately adjacent the stop element and capable of giving to this latter said free edge of each strip; and
wherein the compensating device comprises a respective compensating device active on each stop element to exert said tensioning action in a differentiated way on each film strip.

8. The apparatus of claim 4, wherein:
the transferring device comprises at least one first actuator configured to move the abutment structure of the discrete sheets between said position outside the packaging station and said position inside the packaging station,
the positioning element is supported by the abutment structure of the transferring device of the discrete sheets and is movable with respect to the abutment structure by actions of a second actuator;
the transversally cutting unit comprises at least one third actuator configured to move one or more blades of the transversally cutting unit between a rest position, wherein the one or more blades do not interfere with the film strips, and an active position, wherein the one or more blades are predisposed to transversally cut the film strips in order to form the plurality of discrete sheets of film;

at least one control unit is connected to the first, second and third actuators and is configured to:
command the first actuator to move the abutment structure in a first direction from the external position to the position inside the packaging station,
command the second actuator for imparting to the positioning element a motion with respect to the abutment structure in a second direction opposite to the first direction, the relative motion imparted to the positioning element in the second direction and the motion imparted to the abutment structure in the first direction generally causing the positioning element to approach the stop element,
once the abutment structure has reached the position inside the packaging station and the positioning element is approached the stop element, command the stop element to grippingly act on the film strips, command the positioning element to release the film strips, and command the upper tool to take the discrete sheets from the abutment structure,
with the stop element gripping said film strips and with the stop element releasing the film strips themselves, command the first actuator to move the abutment structure and the positioning element along a third direction opposite to the first direction, bringing the abutment structure to said position outside the packaging station,
command the second actuator to impart to the positioning element a relative motion with respect to the abutment structure in a fourth direction opposite to said third direction until to positioning the positioning element adjacent said abutment structure so that the longitudinal tract of said film strips extending between said positioning element and said stop element is disposed at or above said abutment structure and at or below the blades of said transversally cutting unit,
command the third actuator to move the one or more blades of the transversally cutting unit to the active position and transversally cut the film strips to form the plurality of discrete sheets of film positioned above the abutment structure.

9. The apparatus of claim 8, wherein the control unit is configured to command the third actuator to move the one or more blades of the transversally cutting unit in the active position and transversally cutting the film strips in order to form the plurality of discrete sheets of film positioned above the abutment structure, after the stop element has completed the relative motion with respect to the abutment structure in the fourth direction and maintaining the positioning element and the stop element grippingly on said strips.

10. The apparatus of claim 1, wherein:
the positioning element comprises at least one first and one second gripping portions relatively movable from each other between a gripping condition, wherein the first and second gripping portions are approached each other and configured to grippingly act on a portion of said film strips, and a releasing condition wherein the first and second gripping portions are spaced from each other to enable the positioning element to freely slide with respect to the film strips, and
the compensating device comprises a command member active on the positioning element and configured to position the first and second gripping portions in said gripping condition, in said releasing condition and, further, in an intermediate condition between said gripping condition and said releasing condition; wherein in said intermediate condition the first and second gripping portions are configured to contact said film strips for enabling the positioning element to forcedly slide with respect to the film strips themselves.

11. The apparatus of claim 10, wherein the control unit is configured to:
command said command member and bringing the first and second gripping portions of the positioning element in said intermediate condition, and
maintain in said intermediate condition the first and second portions of the positioning element, command the second actuator to impart to the positioning element the relative motion with respect to the abutment structure in the fourth direction in order to exert said tensioning action on a longitudinal portion of said film strips, which extends between the longitudinally cutting unit and said positioning element and therefore pulling and laying one or more portions of the film strips, extending between said longitudinally cutting unit and said positioning element during the relative motion of the positioning element with respect to the abutment structure in said fourth direction.

12. The apparatus of claim 1, wherein the compensating device comprises at least one thrusting member configured to directly thrustingly act on the surface of the longitudinal tract of at least one of said film strips, extending between said positioning element and said stop element, preferably wherein the compensating device comprises a respective thrusting member configured to directly act on the surface of the longitudinal tract of each of said film strips, extending between said positioning element and said stop element.

13. The apparatus of claim 1, wherein the at least one stop element include a stop element for each film strip, each stop element being configured to grippingly receive the free edge of a respective strip when the positioning element is in a position approached the packaging station, and wherein the compensating device comprises an regulator active on each of said stop elements and configured to move the respective stop element away from the positioning element to exert a pulling action on the film strips.

14. A method of packaging a product, said method comprising:
moving one or more supports on which at least one respective product is placed, along a predetermined advancement path, to a packaging station,
receiving a continuous plastic film continuous at a longitudinally cutting unit,
exerting a tensioning action on one or more portions of film strips disposed between said longitudinally cutting unit and said packaging station,
longitudinally cutting, in said longitudinally cutting unit, the continuous plastic film in order to form two or more film strips,
moving the film strips towards the packaging station, wherein the step of moving the film strips comprises:
engaging a free edge of each of said strips with a positioning element, movable towards and away from the packaging station, and moving the free edge of said film strips towards the packaging station, and
receiving the free edge of said strips by a stop element associated to the packaging station, and
making, inside the packaging station, one or more packages.

15. The method of claim 14, wherein exerting a tensioning action comprises exerting a differentiated tensioning action on each portion of said strips extending between the longitudinally cutting unit and the positioning element.

16. The method of claim 14, wherein the tensioning action on each of said strips is performed by performing at least one of the following steps:
- acting on the positioning element to cause the tensioning of the portions of strips between the longitudinally cutting unit and the positioning element,
- acting on the stop element to cause the tensioning of the portions of strips between the longitudinally cutting unit and the stop element,
- thrustingly acting on a surface of a longitudinal tract of at least one of said film strips extending between said positioning element and said stop element to cause the tensioning of the strips portions between the longitudinally cutting unit and positioning element.

17. The method of claim 14, comprising:
- transversally cutting the film strips at a transversally cutting unit in order to form a plurality of discrete sheets of film,
- disposing the discrete sheets of film on an upper surface of an abutment structure of a transferring device, said abutment structure being movable back and forth along a predetermined operative stroke and configured to receive said discrete sheets and moving them from a position outside the packaging station to a position inside the packaging station,
- moving the abutment structure in order to take the discrete sheets present on said upper surface inside the packaging station,
- taking by an upper tool of the packaging station said discrete sheets of film from the abutment structure disposed in said position inside the packaging station,
- making, inside the packaging station, one or more packages by tightly fluid coupling each of said discrete sheets of film to at least one respective support.

18. The method of claim 17, wherein each positioning element is brought by the abutment structure of the transferring device of the discrete sheets, the method further comprising:
- moving the abutment structure of the discrete sheets in a first direction from the position outside to the internal position to the packaging station,
- simultaneously with the movement of the abutment structure in the first direction and maintaining the positioning element grippingly on said film strips, imparting to the positioning element a relative motion with respect to the abutment structure in a second direction opposite to the first direction, the relative motion imparted to the positioning element in the second direction and the motion imparted to the abutment structure in the first direction, generally causing the positioning element to approach the stop element and the film strips to advance towards the packaging station,
- once the abutment structure has reached the position inside the packaging station and the positioning element is approached the stop element, performing the following further operations: taking the film strips by the stop element, releasing the film strips from the positioning element, and by the upper tool, taking the discrete sheets from the abutment structure,
- by the stop element grippingly on said film strips and by the positioning element which has released the film strips themselves, moving the abutment structure and the positioning element in a third direction opposite to the first direction, bringing the abutment structure to said position outside the packaging station,
- imparting to the positioning element a relative motion with respect to the abutment structure in a fourth direction opposite to said third direction until to positioning the positioning element adjacent said abutment structure so that a longitudinal tract of said film strips, which extends between said positioning element and said stop element, is disposed at or above said abutment structure and at or below blades of the transversally cutting unit, and
- bringing the positioning element again to grip the film strips and, with the positioning element grippingly on said strips, move one or more blades of the transversally cutting unit to the active position and transversally cut the film strips in order to form the plurality of discrete sheets of film positioned above the abutment structure.

19. The method of claim 18, wherein:
- the positioning element comprises at least one first and one second gripping portions movable with respect to each other between a gripping condition, wherein the first and second portions are approached each other and are configured to grippingly act on a portion of said film strips, and a releasing condition wherein the first and second portions are spaced from each other in order to enable the gripping element to freely slide with respect to the film strips, and
- the step of exerting a tensioning action comprises:
  - positioning the first and second gripping portions of the positioning element in an intermediate condition between said griping condition and said releasing condition, wherein the first and second gripping portions contact said film strips in order to enable the gripping element to forcedly slide on the film strips,
  - maintaining the first and second gripping portions of the positioning element in the intermediate condition, performing said relative motion of the positioning element in said fourth direction opposite to said third direction so that during such relative motion in the fourth direction, the positioning element exerts the tensioning action on the portion of strips, disposed between the longitudinally cutting unit and the positioning element itself, in order to lay in this way the one or more portions of strips disposed between the longitudinally cutting unit and the positioning element.

20. The method of claim 14, wherein the step of exerting a tensioning action comprises acting on a thrusting member so that it thrustingly directly acts against the surface of each longitudinal tract of said film strips, extending between said positioning element and said stop element, said thrusting member thrustingly acting on a respective longitudinal tract of said strips, while the positioning member does not grippingly act on said strips to exert the tensioning action on the longitudinal portion of said film strips, extending between the longitudinally cutting unit and said positioning element and therefore laying one or more portions of film strips extending between said longitudinally cutting unit and said positioning element.

21. The method of claim 14, wherein the step of exerting a tensioning action comprises regulating the longitudinal position of a stop element, each stop element being configured to grippingly receive the free edge of a respective strip when the positioning element is in a position approached the packaging station, and wherein the compensating step comprises moving the respective stop element away from the positioning element to exert the tensioning action on the film strips,
- wherein the positioning element does not grippingly act on said strips during the compensating step to exert the tensioning action on the longitudinal portion of said film strips extending between the longitudinally cutting unit and said positioning element and therefore laying one or more portions of film strips extending between said longitudinally cutting unit and said positioning element.

22. The method of claim 14, wherein said step of exerting a tensioning action is performed before transversally cutting the film strips in order to form the plurality of discrete sheets of film.

23. The method of claim 14, wherein making one or more packages by fluid tightly coupling each of said discrete sheets of film to at least one respective support, comprises:
   tightly constraining each film sheet to at least a perimetral edge of a respective support,
   removing gas from a packaging chamber defined inside the packaging station, and
   extracting the packaged product from the packaging station.

* * * * *